Sept. 8, 1959     A. E. WHITECAR     2,902,806
APPARATUS FOR ASSEMBLING PACKAGES
Filed Jan. 26, 1955     22 Sheets-Sheet 1

INVENTOR.
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 3

INVENTOR.
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 4

INVENTOR.
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 5

INVENTOR.
ALTEN E. WHITECAR
BY
ATTORNEYS

Sept. 8, 1959  A. E. WHITECAR  2,902,806
APPARATUS FOR ASSEMBLING PACKAGES
Filed Jan. 26, 1955  22 Sheets-Sheet 6
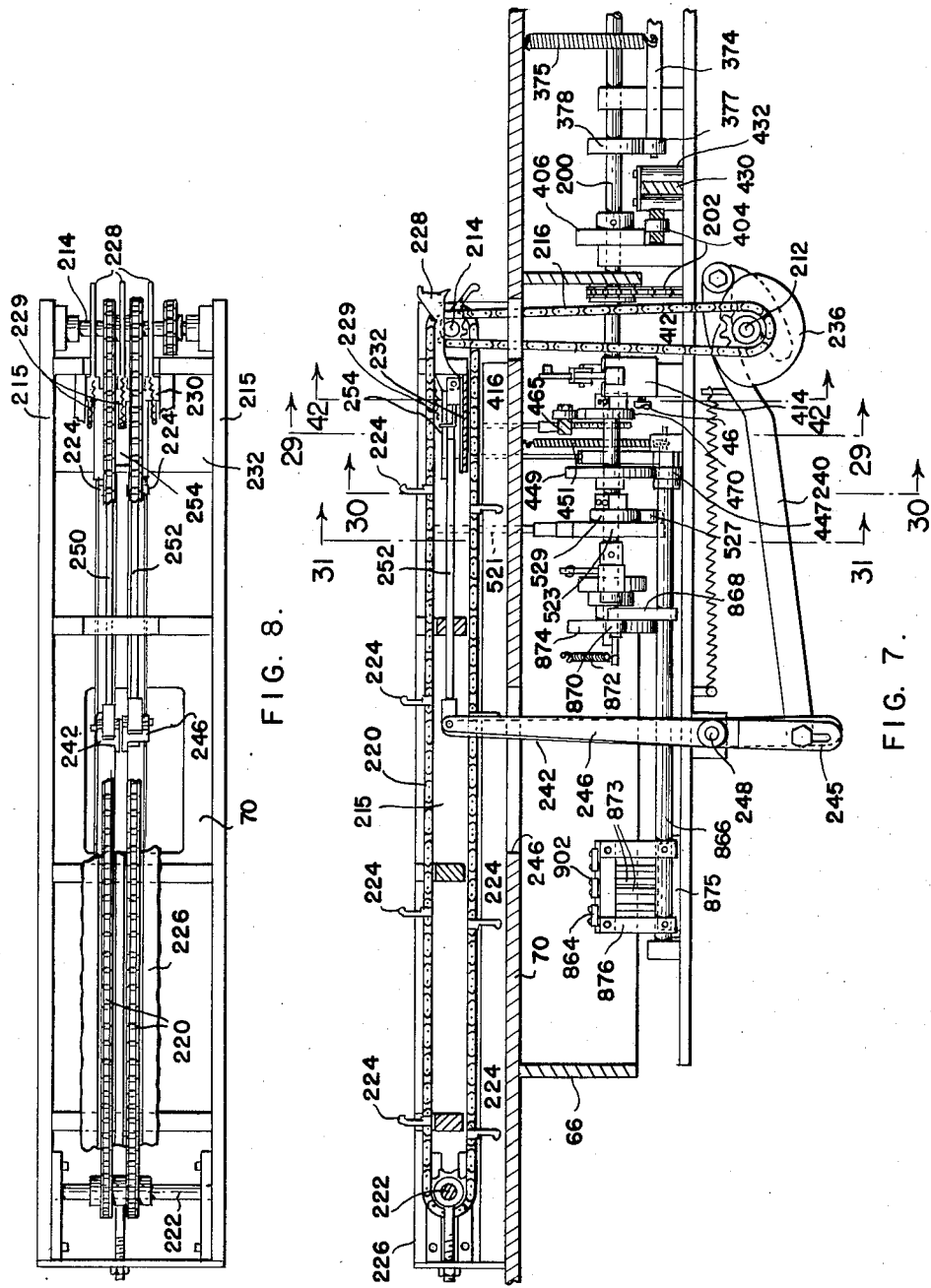
INVENTOR.
ALTEN E. WHITECAR
BY
ATTORNEYS

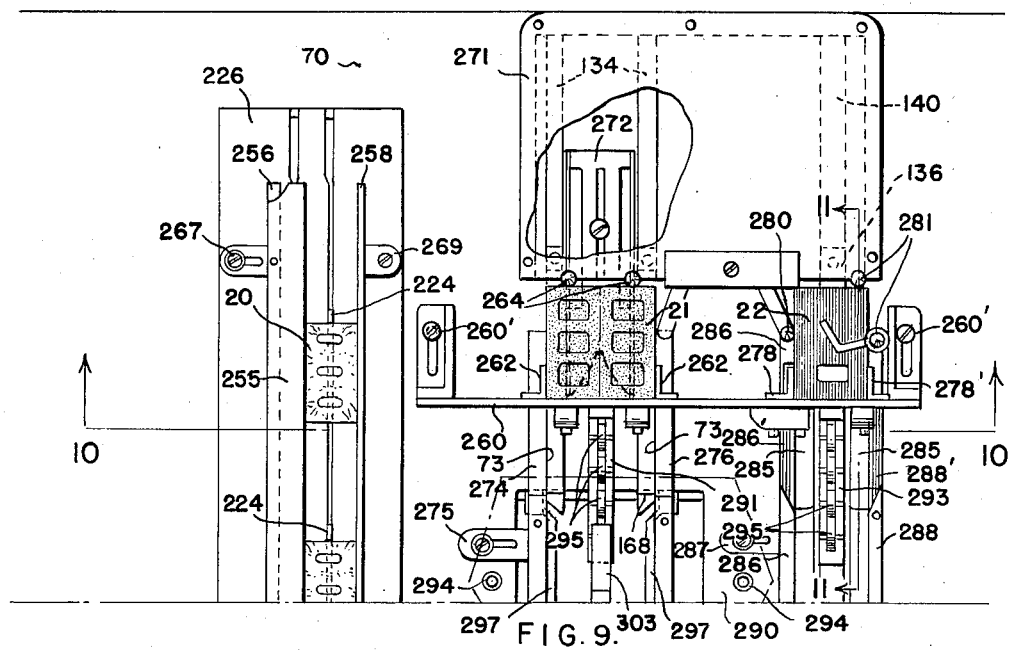
FIG. 9.
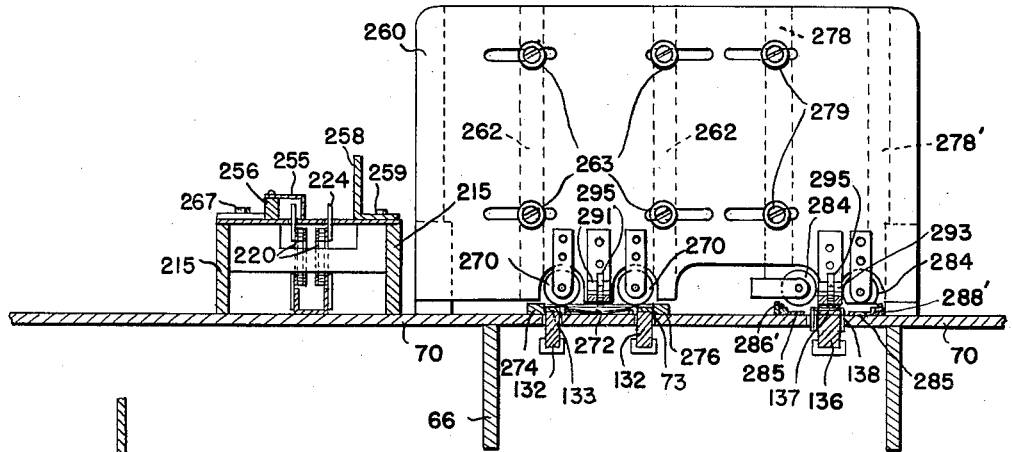
FIG. 10.
FIG. 11.

Sept. 8, 1959 A. E. WHITECAR 2,902,806
APPARATUS FOR ASSEMBLING PACKAGES
Filed Jan. 26, 1955 22 Sheets-Sheet 9

INVENTOR.
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 11

INVENTOR.
ALTEN E. WHITECAR
BY
ATTORNEYS

Sept. 8, 1959     A. E. WHITECAR     2,902,806
APPARATUS FOR ASSEMBLING PACKAGES
Filed Jan. 26, 1955     22 Sheets-Sheet 12

*INVENTOR.*
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 13

INVENTOR.
ALTEN E. WHITECAR
BY
ATTORNEYS

Sept. 8, 1959     A. E. WHITECAR     2,902,806
APPARATUS FOR ASSEMBLING PACKAGES
Filed Jan. 26, 1955     22 Sheets-Sheet 14

INVENTOR.
ALTEN E. WHITECAR
BY
ATTORNEYS

Sept. 8, 1959     A. E. WHITECAR     2,902,806
APPARATUS FOR ASSEMBLING PACKAGES
Filed Jan. 26, 1955     22 Sheets-Sheet 15

*INVENTOR.*
ALTEN E. WHITECAR
BY
ATTORNEYS

Sept. 8, 1959 A. E. WHITECAR 2,902,806
APPARATUS FOR ASSEMBLING PACKAGES
Filed Jan. 26, 1955 22 Sheets-Sheet 16

INVENTOR.
ALTEN E. WHITECAR
BY
ATTORNEYS

Sept. 8, 1959     A. E. WHITECAR     2,902,806
APPARATUS FOR ASSEMBLING PACKAGES
Filed Jan. 26, 1955     22 Sheets-Sheet 17

INVENTOR.
ALTEN E. WHITECAR
BY
ATTORNEYS

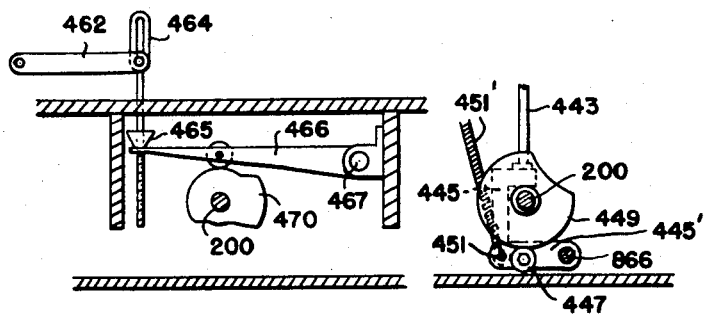
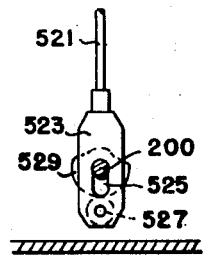
FIG. 29   FIG. 30   FIG. 31
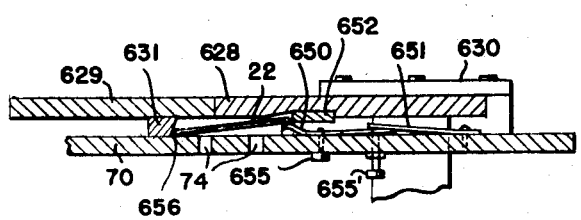
FIG. 32.
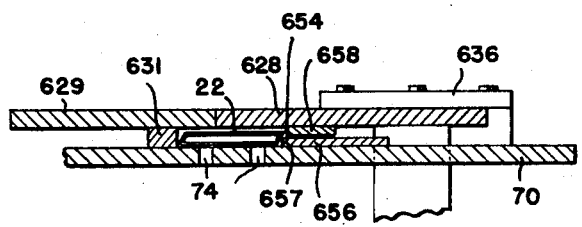
FIG. 33.
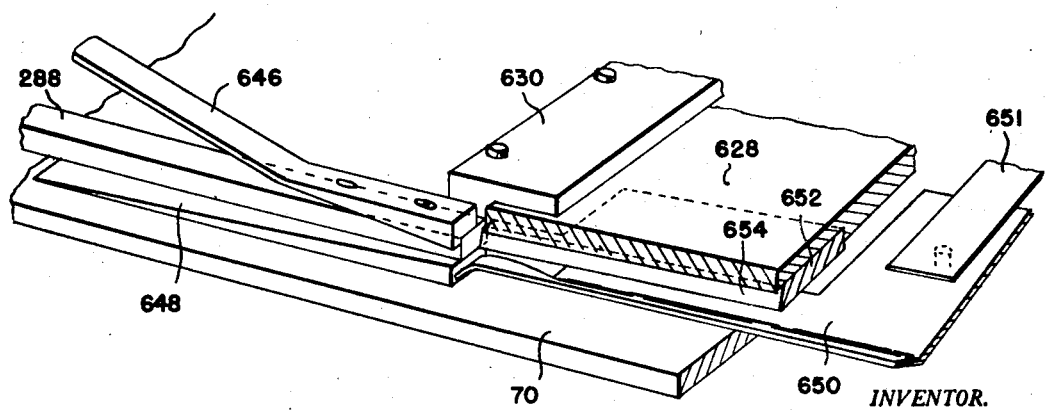
FIG. 34.

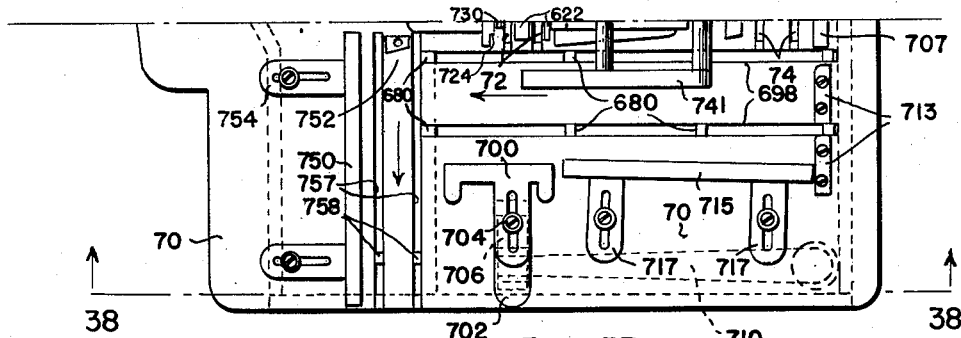
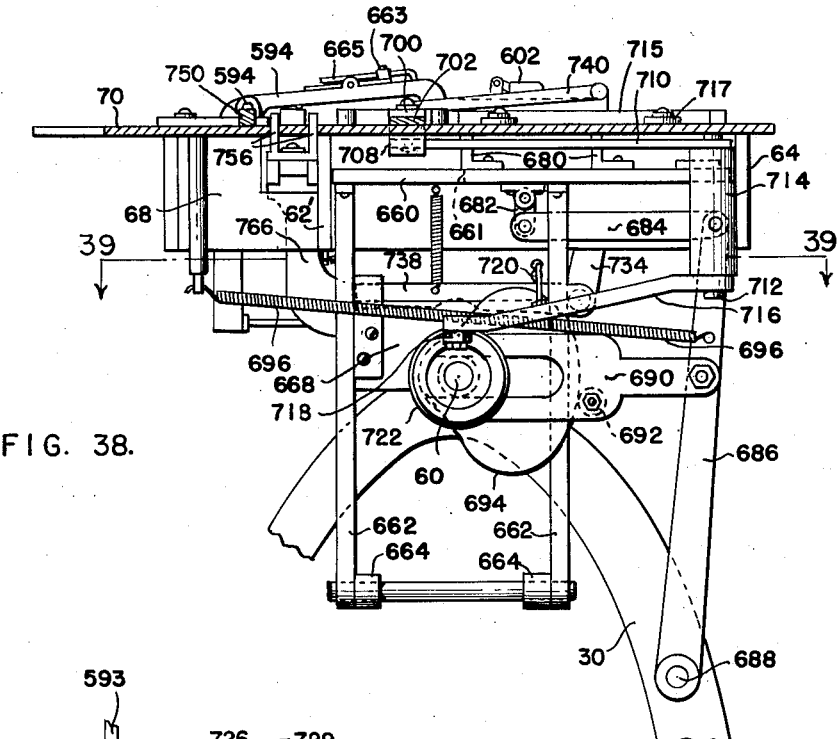
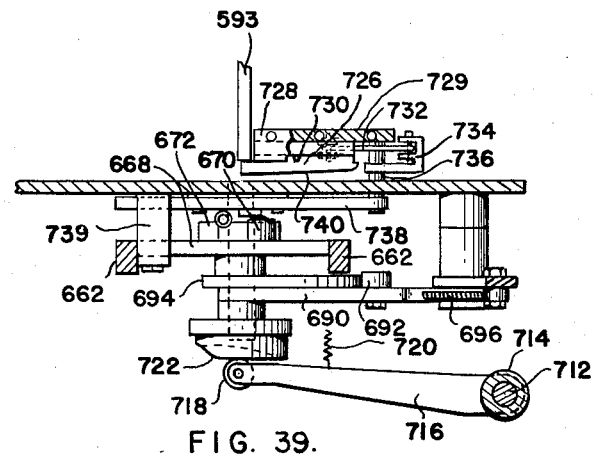

Sept. 8, 1959  A. E. WHITECAR  2,902,806
APPARATUS FOR ASSEMBLING PACKAGES
Filed Jan. 26, 1955  22 Sheets-Sheet 21

INVENTOR.
ALTEN E. WHITECAR
BY
ATTORNEYS

United States Patent Office 2,902,806
Patented Sept. 8, 1959

2,902,806

APPARATUS FOR ASSEMBLING PACKAGES

Alten E. Whitecar, Westville, N.J., assignor to Smith, Kline & French Laboratories, Philadelphia, Pa., a corporation of Pennsylvania Application January 26, 1955, Serial No. 484,273

11 Claims. (Cl. 53—157)

This invention relates to apparatus for assembling packages and, more particularly, to apparatus for positioning an article into an insert and for inserting the article containing insert into an enclosure.

More particularly, it is the object of this invention to provide a machine which will receive a succession of cellophane packages of the type formed by two sheets of cellophane in heat sealed relationship containing between the sheets in spaced arrangement a plurality of articles, such as for example, capsules or tablets, and deliver these packages to a succession of package holder frames which are automatically and successively fed from a magazine containing a stack of frames. The machine thereafter feeds the assembled frames and cellophane packages into sleeves which have been fed from a stack of sleeves in a magazine, opened in anticipation of the entry of the frames and positioned to receive successive frames. The machine then delivers the successive assemblies each comprising a cellophane package, a sleeve and a frame to any suitable receiving means.

It is a further object of the invention to provide a machine for assembling packages of the type described above which is adjustable to accommodate packages of various widths and lengths.

It is a further object of the invention to provide a machine of the type described which is provided with operation arresting apparatus responsive to maloperation at any of a plurality of stations on the machine.

These and other objects of the invention, particularly with regard to the structural details thereof, will become apparent from the following description when read in conjunction with the accompanying drawings, in which:

Figure 7 is a fragmentary longitudinal section of the machine taken on the trace 7—7 shown in Figure 3;

Figure 8 is a partially cut away fragmentary top view of the portion of the machine shown in Figure 7;

Figure 9 is an enlarged fragmentary plan view of the top of the machine showing the input end thereof;

Figure 10 is a fragmentary transverse vertical section of the machine taken on the trace 10—10 shown in Figures 2, 3 and 9;

Figure 11 is a fragmentary longitudinal vertical section of the machine taken on the trace 11—11 shown in Figure 9 showing parts of the machine displaced from the positions thereof shown in Figures 9 and 10;

Figure 14 is an enlarged fragmentary plan view of the top of the machine showing the portion thereof adjoining the portion shown in Figure 9;

Figure 15 is a fragmentary vertical transverse section through the machine taken on the trace 15—15 shown in Figures 2, 3 and 14;

Figure 29 is a fragmentary transverse vertical section through the machine taken on the trace 29—29 shown in Figure 7;

Figure 30 is a fragmentary transverse vertical section through the machine taken on the trace 30—30 shown in Figure 7;

Figure 31 is a fragmentary transverse vertical section through the machine taken on the trace 31—31 shown in Figure 7;

Figure 32 is a fragmentary vertical transverse section through the machine taken on the trace 32—32 shown in Figure 26;

Figure 33 is a fragmentary vertical transverse section through the machine taken on the trace 33—33 shown in Figure 26;

Figure 34 is a perspective view of a portion of the apparatus shown in Figure 26;

Figure 37 is an enlarged fragmentary plan view of the top of the machine showing the discharge end thereof;

Figure 38 is a fragmentary partially cut-away elevation of the discharge end of the machine taken on the trace 38—38 shown in Figures 2, 3 and 37;

Figure 39 is a fragmentary transverse section through the machine taken on the trace 39—39 shown in Figure 38;

Figure 1:
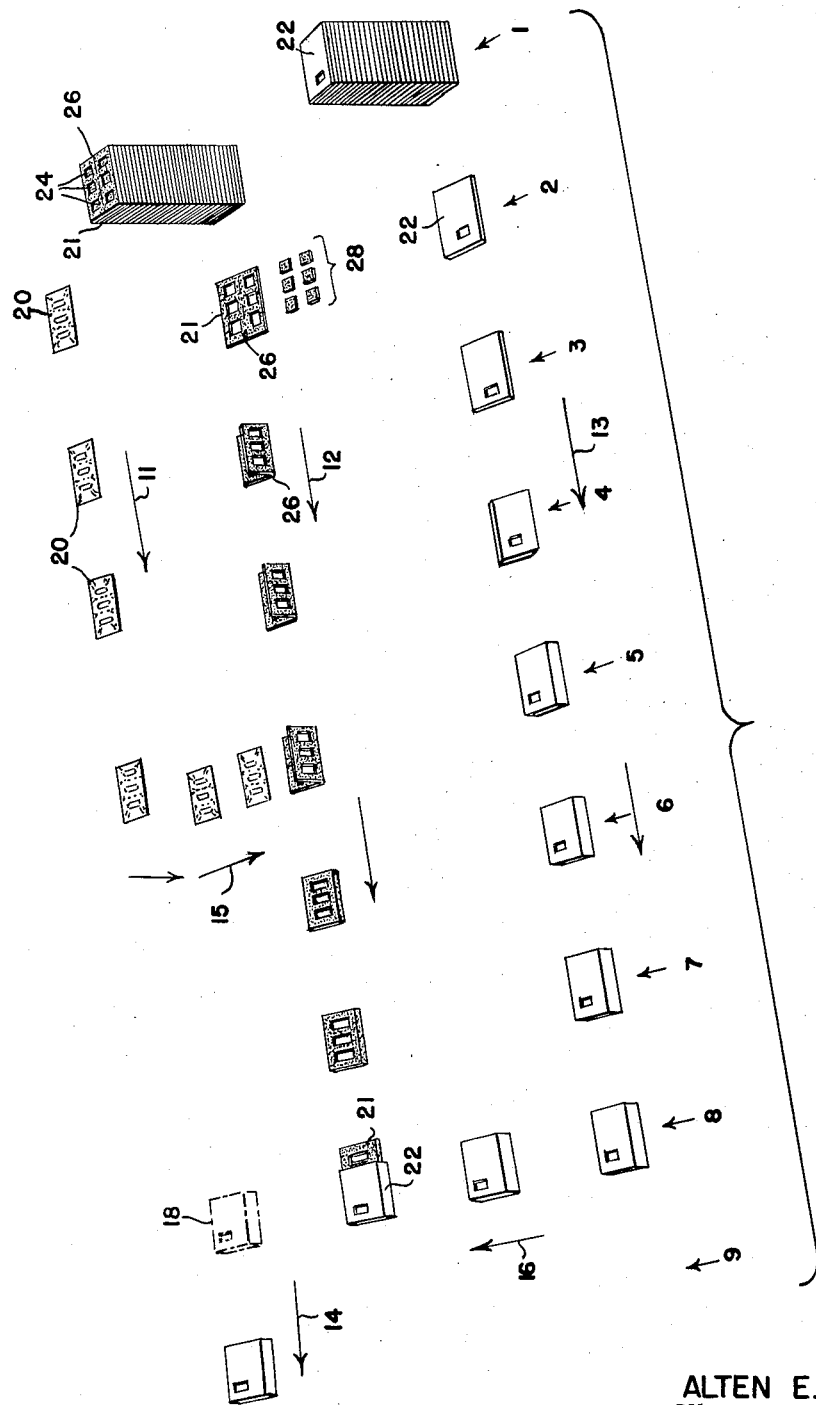
Figure 1 is a diagram showing the flow paths provided by various conveyors on the machine and the various stations thereon at which various operations are performed on the package parts in the process of assembly of the packages.

Referring to the flow diagram shown in Figure 1, the machine includes what may be referred to as nine stations which are indicated at 1-9 in Figure 1. The machine additionally includes four longitudinally extending conveyor lines indicated by the arrows 11, 12, 13 and 14, and two transversely extending conveyor lines indicated by the arrows 15 and 16. Hereinafter the right-hand end of the diagram of Figure 1 will be referred to as the input end, the left-hand end as the output end, the upper side of the diagram will be referred to as the front and the lower side of the diagram will be referred to as the rear.

The package assembled in the embodiment of the invention disclosed herein comprises a cellophane capsule package 20, a cardboard frame 21 and a sleeve 22. The capsule package may also be formed of paper, foil or other flexible material and the capsules contained therein may alternatively be tablets or other articles of similar size and shape. The cardboard frame may be alternatively formed of plastic or other sufficiently stiff material to satisfactorily retain the capsule package and the sleeve may be formed of cardboard, plastic, foil or other suitable material. A succession of cellophane packages 20 are progressed along the conveyor line 11 to station 5 of the apparatus at which point they are carried by the transversely extending conveyor 15 toward the rear of the machine.

The cardboard frames 21 are provided with a plurality of areas 24 defined by weakened lines. The frames are also provided with a longitudinally extending weakened line 26. In station 1 of the conveyor line 12, there is provided a stack of frame members. Frame members are fed successively from the bottom of the stack to the conveyor line 12. In station 2 of the conveyor line, the portions of the cardboard forming the areas 24 bounded by the weakened lines are removed as indicated at 28. At station 3 the cardboard frame is folded on the weakened line 26 to a position in which the two halves of the frame extend at right angles to each other. The frame is then progressed to station 5 at which point the cellophane package is inserted therein. At station 6 the upstanding half of the frame 21 is folded down over the cellophane package serving to retain the cellophane package in such a position that the capsules or other articles contained within the cellophane package extend into the regions of the frame from which the frame portions, indicated at 28 in station 2, have been removed.

At station 1 in the conveyor line 13, there is provided a stack of sleeves 22. Sleeves are fed successively from the bottom of the stack and progress down the conveyor line 13 toward the output end of the machine. The sleeves stacked in station 1 are in a flattened form, i.e., the upper panel of each sleeve is pressed down and is in engagement with the lower panel of the sleeve. The sleeves are in this form as they are fed from station 1 and progress along the conveyor line 13. At stations 4, 5 and 6, apparatus is provided for opening the sleeves. This apparatus serves to form the parallelogrammed sleeves to a condition wherein the top, bottom and side panels of the sleeves are in substantially rectangular arrangement. The opened sleeves are then delivered to station 8 wherein they are engaged by the conveyor line 16 and carried transversely of the machine from the rear to the front thereof.

The sleeves are successively positioned by the conveyor 16 adjacent to the output end of the conveyor line 12 at which position frames carrying cellophane packages are inserted into the sleeves. The successive sleeves are then moved to station 8 of conveyor line 14 which thereafter serves to discharge the assembled packages from the output end of the machine. It should be noted that the assembly shown at 19 in Figure 1 does not actually occupy that position when the other parts are in the positions as shown. The assembly shown at 18 merely indicates a position at which the assemblies are delivered to the conveyor 14 and through which they pass as they are carried by the conveyor 14.

Hereinafter, in connection with the description of the structure of the machine disclosed, the foregoing reference numerals and directional indications will be employed for general definition of the conveyor lines and of the front, rear, input and ouput ends of the machine.

Figure 2:
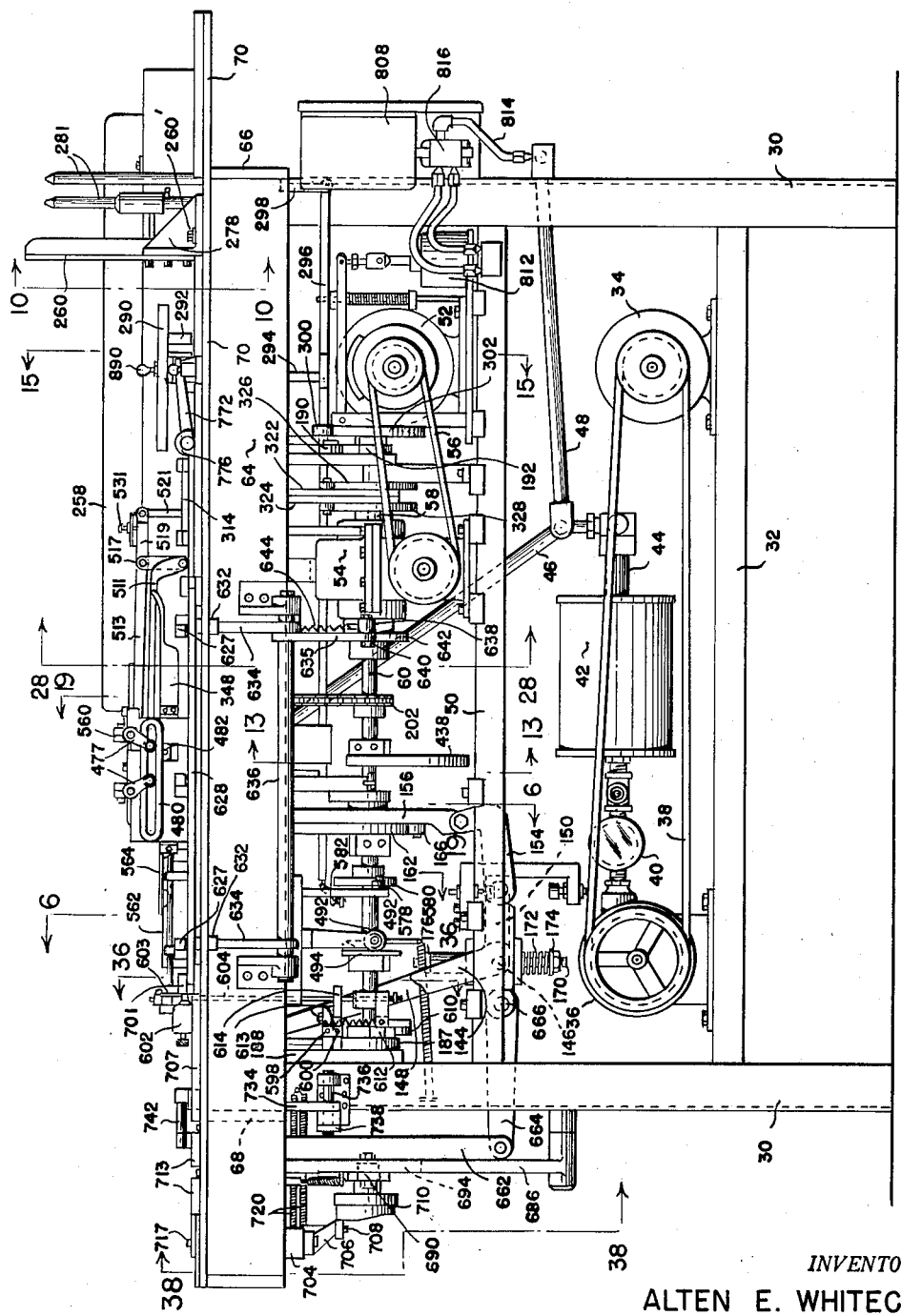
Figure 2 is a rear elevation of the machine.

As is best illustrated in Figure 2 of the drawings, the machine includes a framework comprising legs 30 between which there extends a lowermost platform 32. Mounted on this platform is a motor 34, a vacuum pump 36 driven by the motor 34 by means of a belt 38, a strainer 40 connected between the inlet end of the vacuum pump 36 and one side of a reservoir tank 42. The other side of the reservoir tank 42 is connected to pipe fitting 44 to which there is in turn connected two vacuum lines 46 and 48. The vacuum lines 46 and 48 are connected to apparatus which will be hereinafter described.

Mounted on the upstanding legs 30 and above the lowermost platform 32 is an intermediate platform frame 50. A motor 52 is mounted on this platform and serves to drive a speed reducer 54 by means of a belt 56 passing over conventional motor and speed reducer pulleys.

A cam shaft 58 extending longitudinally of the machine and toward the input end thereof from the speed reducer 54 is driven by the speed reducer 54 and mounts a plurality of cams serving to actuate the various mechanisms of the machine which will be hereinafter described. A cam shaft 60 extends longitudinally of the machine toward the output end thereof from the speed reducer 54, is driven thereby and also mounts a plurality of cams serving to actuate various mechanisms which will be hereinafter described. The cam shafts 58 and 60 are supported by conventional bearing means on the platform frame 50 which need not be specifically described.

Attached to the uppermost ends of the legs 30 is a front longitudinally extending frame plate 62, a similar rear longitudinally extending frame plate 64, an input end transversely extending frame plate 66 and an output end transversely extending frame plate 68. Mounted on top of these frame plates is a horizontally extending top plate 70 over which the package frames, the tablet packages and the sleeves are carried by the various conveyors during the performance of the various operations previously described. Apparatus providing these conveyors and for performing these individual operations will now be described.

Figure 3:
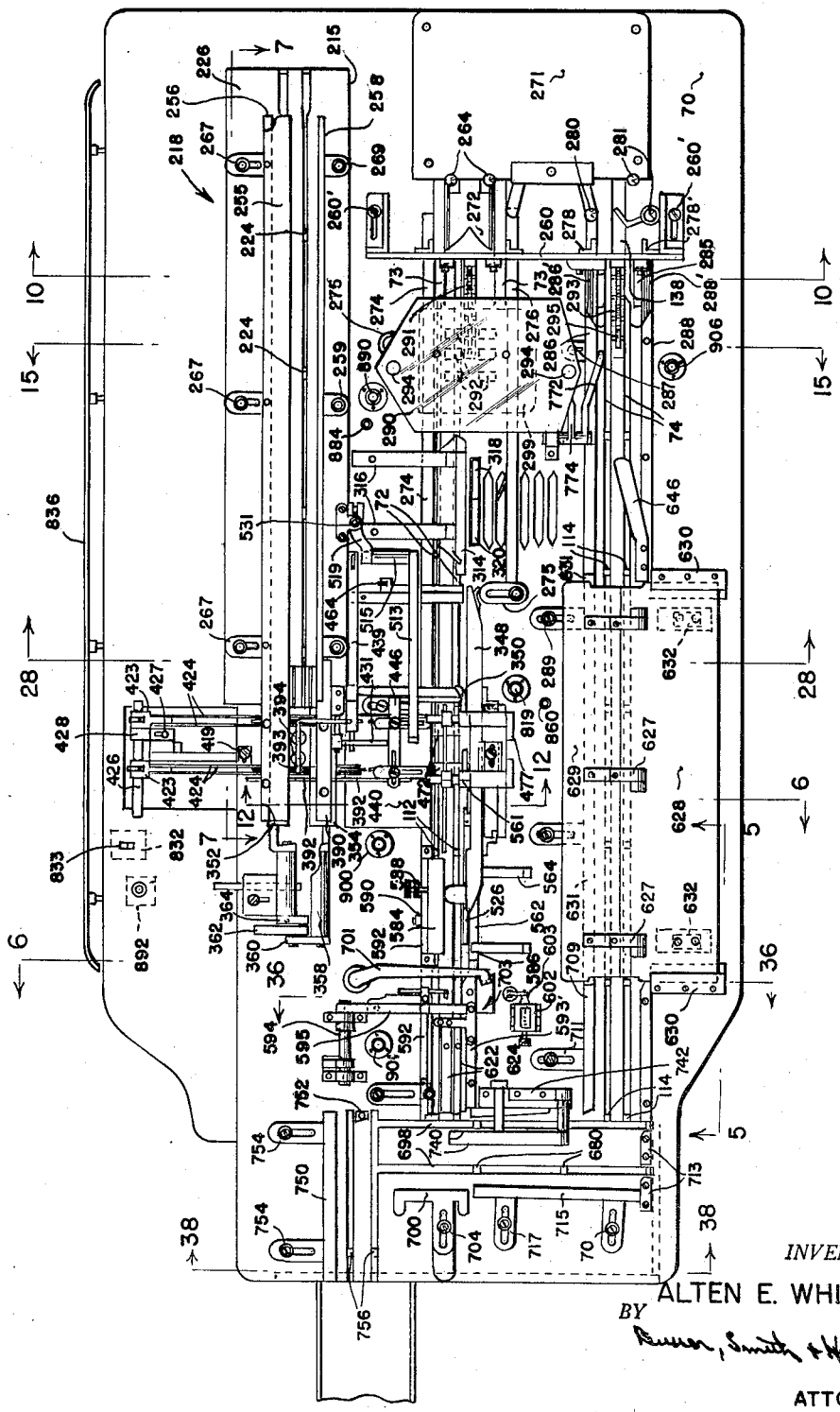
Figure 3 is a top view of the machine.

As will be seen in Figure 3, the top plate 70 is provided with a plurality of slots through which the various advancing means comprising the frame and sleeve conveyors indicated at 12 and 13, respectively, in Figure 1 pass upwardly in engagement with the frame and sleeve members on the top plate. A pair of slots 72 is associated with frame conveyor line 12 from the right-hand side of the center portion of the conveyor as viewed in Figure 3, i.e., between stations 2 and 3, to the left-hand or discharge end of the frame conveyor, and a pair of slots 73 is associated with frame conveyor line 12 at the right-hand end thereof as viewed in Figure 3. A pair of slots 74 is associated with the sleeve conveyor line 13 for its entire length.

Figure 4:
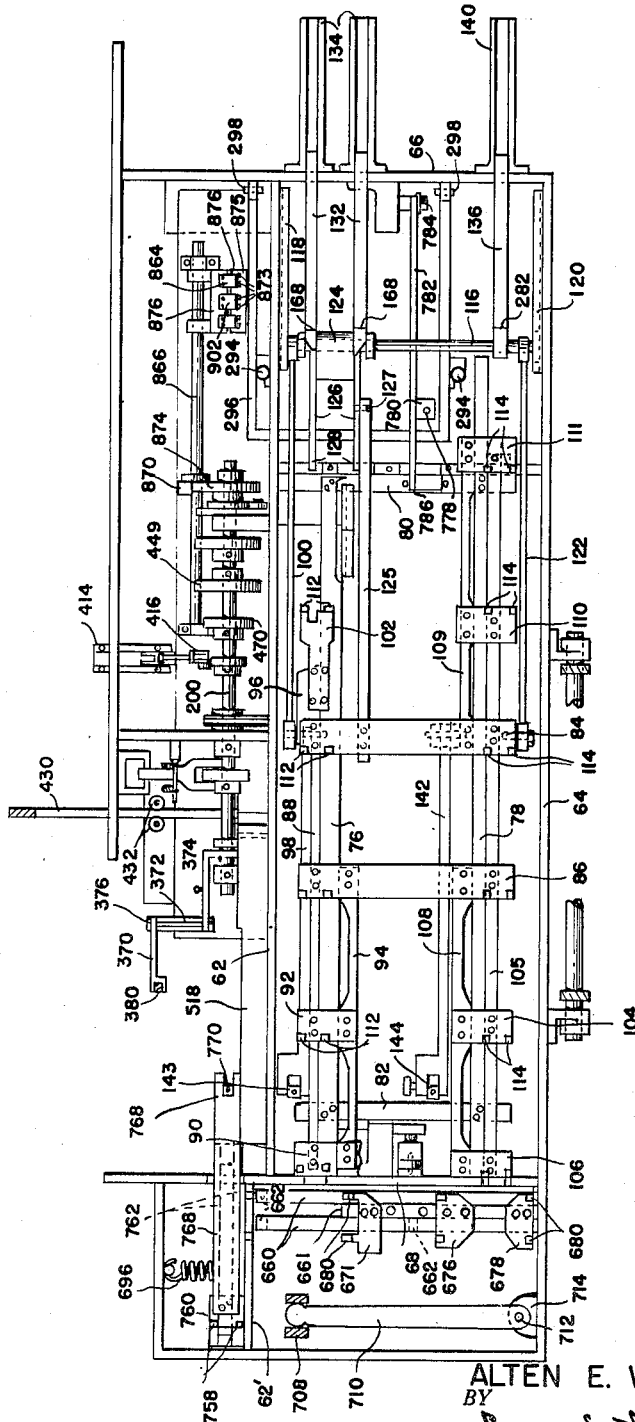
Figure 4 is a top view of the machine with a top plate thereof removed showing portions of the conveyor mechanism involved.

As shown in Figure 4, a longitudinally extending bar 76 is positioned beneath the top plate 70 in the vicinity of the slots 72 therein and a longitudinally extending bar 78 is positioned beneath the top plate 70 in the vicinity of the longitudinally extending slot 74 therein. The left-hand ends of these bars, as viewed in Figure 4, terminate in a region equivalent to the output end of station 7. The bars 76 and 78 are attached adjacent to the left ends thereof to a transversely extending member 82. A transverse section of the machine showing these parts in elevation is presented in Figure 36. The input or right-hand ends of the bars 76 and 78, as viewed in Figure 4, terminate in a region equivalent to the output and input ends, respectively, of station 2. The bars 76 and 78 have their right-hand end portions attached to a transversely extending member 80 also seen in the transverse section of Figure 15. Transversely extending plates 84 and 86 positioned in spaced relation between the members 80 and 82 extend across the bars 76 and 78 and are slidable thereon. The plate 84 is shown in approximately the discharge position of station 4 and plate 86 is shown in approximately the discharge position of station 5.

A bar 88 extends parallel to the bar 76 and is connected to the plates 84 and 86. Also attached to the bar 88 toward the discharge end of the machine from the plate 86 are small plates 90 and 92. A longitudinally extending bar 94 is also connected to the transverse plate 86 and the plates 90 and 92. The bar 94 and the bar 88 are positioned on opposite sides of the bar 76 and thus serve to position the plate 86 and the plates 90 and 92 transversely with regard to the bar 76. The right-hand end of the bar 88, as viewed in Figure 4, is provided with an enlarged portion 96 to which there is pivotally mounted the right-hand end of a longitudinally extending rod 98 and the left-hand end of a rod 100. Also affixed to the enlarged portion 96 of the bar 88 is a plate 102.

The plates 84 and 86 previously noted are affixed to a longitudinally extending bar 105. Small plates 104 and 106 are affixed to the bar 105 in transversely adjacent positions to the small plates 90 and 92, respectively. A longitudinally extending bar 108 is positioned adjacent to the bar 78 on the opposite side thereof from the bar 105. The plate 86 and the plates 104 and 106 are also attached to the bar 108. The bar 108 and the bar 105 serve to position the plates 104 and 106 and the plates 84 and 86 with respect to the bar 78. A plate 110 is affixed to the bar 105 in a position transversely across the machine from the plate 102 previously described. The plate 110 extends transversely across the bar 78 and is affixed to a longitudinally extending bar 109 which has its left-hand end, as viewed in Figure 4, attached to the plate 84. The right-hand end of the bar 109 extends to the right of the transversely extending member 80 as does the right-hand end of the bar 105. A plate 111 is affixed to the right-hand ends of the bars 105 and 109.

Each of the transversely extending plates 84 and 86 and each of the plates 90, 92 and 102 are provided with a pair of upstanding fingers 112 which are positioned to extend upwardly through the slots 72 in the plate 70. These fingers are presented for engagement with the frame members in the stations 3–7 shown in the conveyor line indicated at 12 in Figure 1. Hereinafter, these fingers will be referred to as frame conveyor fingers and will be referred to with regard to the station in which the fingers are operative. The rearward end of each of the plates 84 and 86 and each of the plates 104, 106, 110 and 111 are similarly provided with a pair of upstanding fingers 114 which are positioned to extend upwardly through the slots 74 in the top plate and serve to advance the sleeve members through their various stations. Hereinafter these fingers will be referred to as sleeve conveyor fingers and reference will be made in terms of stations in which the fingers act.

A rod 116 extends transversely of the frame plates 62 and 64 in the regions of the right-hand ends thereof as viewed in Figure 4 and is mounted in guide members 118 and 120 affixed to the frame plates 62 and 64, respectively, whereby the rod 116 is movable longitudinally of the machine. The right-hand end of the rod 100 is pivotally connected to the rod 116. As previously described, the left-hand end of the rod 100 is connected to the member 88. A rod 122 similar to the rod 100 has its left-hand end pivotally connected to the plate 84 and its right-hand end pivotally connected to the transverse rod 116.

A member 124 is pivotally mounted on the transverse rod 116 and has a pair of arms 126 extending toward the output end of the machine terminating in upstanding fingers 128. These fingers, as will be seen from Figure 14, are adapted to extend upwardly through cutouts 71 in the top plate 70 and recesses in the plate 70 on the discharge sides of the cutouts 71.

Positioned in each of the two slots 73 which extend from the input end of the machine to the cutouts 71 is a longitudinally extending member 132. The members 132 have their left-hand ends mounted on the transverse rod 116 and their right-hand ends slidably supported on stationary guide members 134 affixed to and extending outwardly from the input side of the end frame plate 66. The members 132 are shown in section in Figure 10 and will be described in greater detail in conjunction therewith.

A longitudinally extending bar 125, viewed in Figure 4, has its left-hand end affixed to the plate 84 and its right-hand end pivotally connected to one of the arms 126 in a slot therein as indicated at 127 and rests upon the member 80.

A longitudinally extending member 136 has its left-hand end connected to the transverse rod 116 and is positioned to extend into a slot 138 in the top plate 70. The slot 138 appears at the right-hand or input end of the top plate 70 and has its left-hand end terminating between the slots 74. The right-hand end of the member 136 is slidably supported on a stationary guide member 140 affixed to and extending outwardly from the input side of the end frame plate 66. The member 136 is shown in section in Figure 10 and will be described in greater detail in conjunction therewith.

Figure 5:
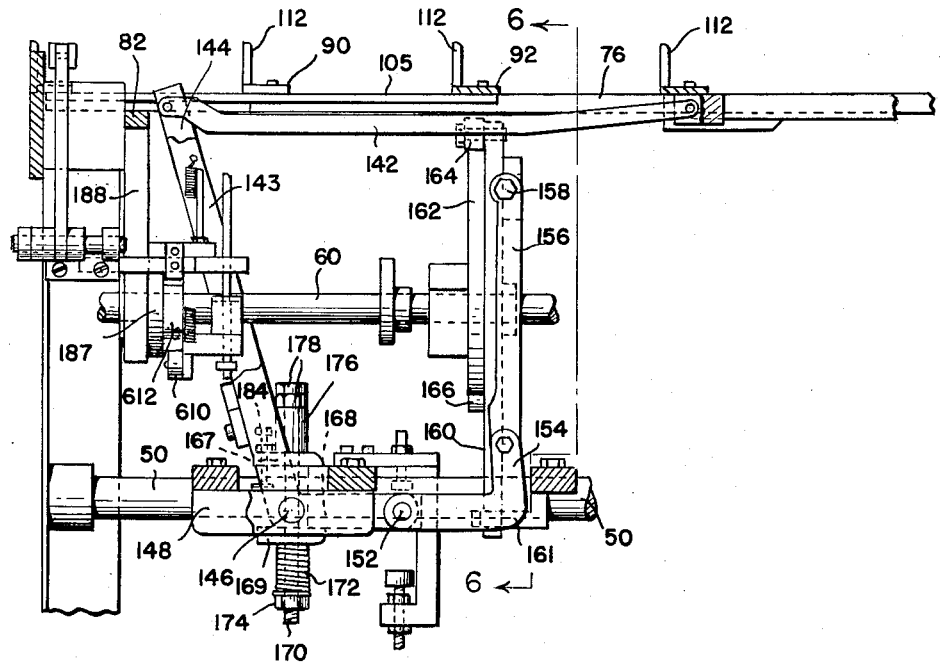
Figure 5 is a fragmentary partially cut-away rear elevation of the machine showing mechanism for longitudinally oscillating the conveyor mechanism.
Figure 6:
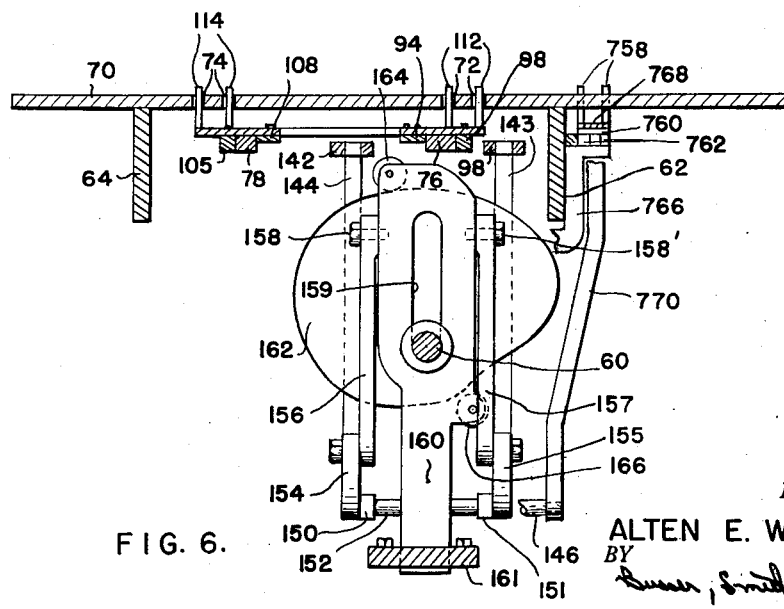
Figure 6 is a fragmentary vertical transverse section through the machine taken on the trace 6—6 shown in Figures 2, 3 and 5.
Figure 41:
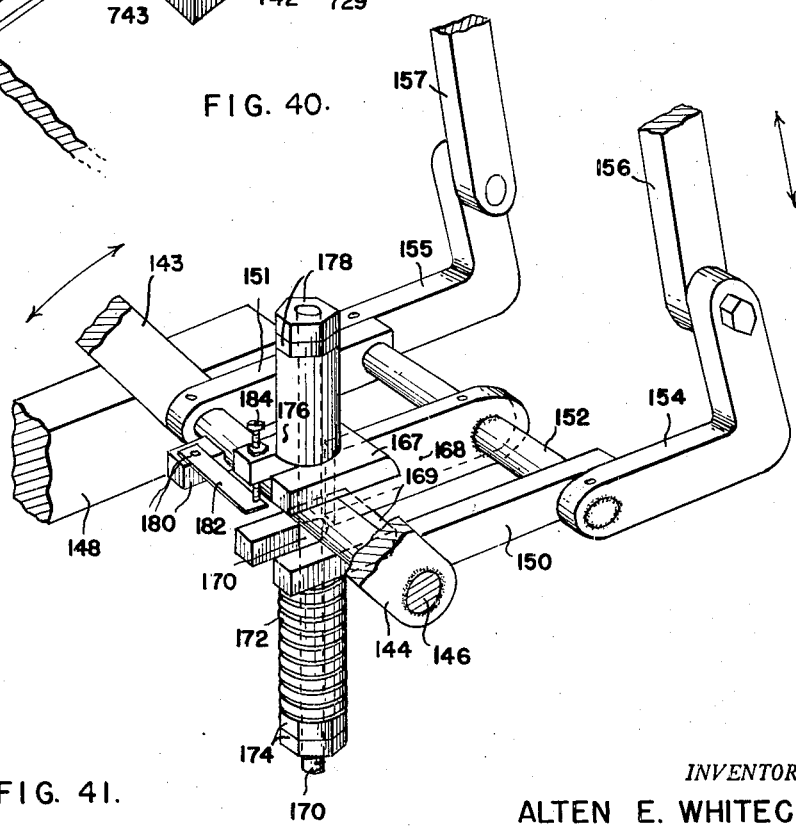
Figure 41 is a perspective view of a portion of the apparatus shown in Figure 5.

As previously described, a rod 98 is pivotally connected to the bar 88 and extends in the direction of the output end of the machine therefrom. A similar rod 142 has its right-hand end pivotally connected to the plate 84 in the region of the sleeve conveyor fingers 114 thereon. The left-hand ends of the rods 98 and 142 are pivoted to upstanding arms 143 and 144, respectively. Referring to Figures 5, 6 and 41 the lower ends of the arms 143 and 144 are affixed to a transversely extending shaft 146 which is rotatably mounted in frame members 148 supported on the platform frame 50. The lower ends of the arms 143 and 144 are rigidly connected to ends of generally horizontally extending arms 151 and 150, respectively, which are also mounted on the shaft 146. The opposite ends of the arms 150 and 151 are rotatably mounted on a rod 152 extending therethrough. Affixed to the rod 152 adjacent to the ends of the arms 150 and 151, respectively, are ends of angle forming members 154 and 155. The angle forming members extend toward the input end of the machine and upwardly from the rod 152 and have their other ends pivotally connected to the lower ends of a pair of vertically extending bars 156 and 157, respectively. The upper ends of the bars 156 and 157 are pivotally mounted at 158 and 158' to a vertically and transversely extending plate 160. The plate 160 is provided with a vertically extending slot 159 adapted to pass the cam shaft 60. The lower end of the plate 160 passes through a slot in an angle 161 mounted under the platform frame 50. It will be evident that this arrangement provides guides restricting movement of the plate 160 to vertical movement. The plate 160 is adapted to be move upwardly and downwardly by the action of a cam 162 mounted on the cam shaft 60 and in engagement with upper and lower cam followers 164 and 166, respectively, mounted on the plate 160.

Also rigidly mounted on the rod 152 intermediate of the arms 150 and 151 is the right-hand end of a plate 168 which has affixed to its left-hand end, as viewed in Figures 5 and 41, a pair of fork forming members 167 and 169 which are positioned above and below the shaft 146. A bolt 170 extends generally vertically through the shaft 146 and is in rigid engagement therewith. The bolt 170 also extends freely through slots in the upper and lower fork members 167 and 169. Positioned on the lower end of the bolt 170 below and in engagement with the fork plate 169 is a spring 172. The lower end of the spring is engaged by locked nuts 174 which are threaded onto the bolt 170. A sleeve 176 is fitted over the upper end of the bolt 170 and is held in engagement with the upper fork plate 167 by means of locked nuts 178.

An insulated block 180 is affixed to the shaft 146 and supports a contact blade 182. A screw 184 is extended through and mounted in the fork plate 167 and is adapted to engage the blade 182 upon compression of the spring 172.

From the foregoing it will be evident that, upon rotation of the cam shaft 60 and resulting rotation of the cam 162, the plate 160 will oscillate upwardly and downwardly moving the arms 150 and 151. This will result in oscillatory motion of the shaft 146 and of the upstanding arms 143 and 144. Oscillation of these arms will cause longitudinal oscillation of the rods 98 and 142 connected to the conveyor mechanism described in connection with Figure 4 resulting in oscillatory motion of the upstanding conveyor fingers 112 and 114, fingers 128 on arms 126, and shoulders 168 and 282 on members 132 and 136, respectively. The arrangement is such as to provide one full cycle of oscillation of the fingers and shoulders with each rotation of the main cam shaft 60.

The arrangement shown in perspective in Figure 41 provides a safety feature which, if forward motion of the conveyor fingers is in any way resisted, would result in the compression of the spring 172 as the result of a toggling action occurring between the angle links 154, 155 and the arms 150, 151. Immediately upon such toggling action taking place, the contact screw 184 will engage the contact blade 182 initiating operation of a safety control circuit which will be hereinafter described.

Figure 36:
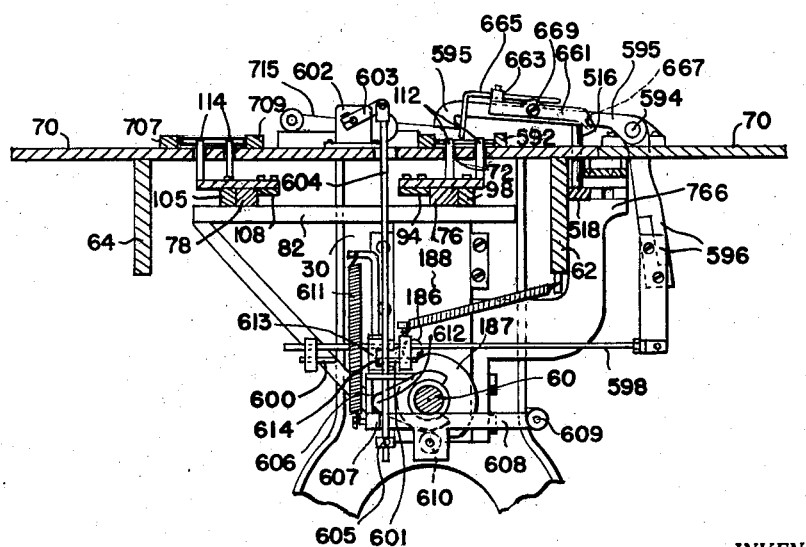
Figure 36 is a fragmentary transverse vertical section through the machine taken on the trace 36—36 shown in Figures 2, 3 and 35.

The transversely extending members 80 and 82 previously described in connection with Figure 4 and which serve to support the longitudinally moving conveyor mechanism are in turn each supported for vertical oscillatory motion as shown in Figures 2 and 15 and 36, respectively. As shown in Figure 36, the member 82 is supported on a vertically extending plate 188 on which is mounted a cam follower 186 adapted to ride on a cam 187 mounted on the cam shaft 60. Similarly, the transverse bar 80 is mounted on a vertically extending plate 198 shown in Figure 15 to which there is attached a cam follower 190 adapted to ride on a cam 192 mounted on the cam shaft 58.

These arrangements are such that, upon each rotation of the cam shafts 58 and 60, the conveyor supporting members 80 and 82 move upwardly and downwardly through one cycle of oscillation. The cams providing for vertical conveyor oscillation and the cams providing for horizontal conveyor oscillation are in such relative positions as to provide for the conveyor fingers 112 and 114 to be extended upwardly above the top plate 70 during motion of the conveyor toward the output end of the machine and to provide for depression of the fingers below the top plate 70 upon motion of the conveyor back toward the input end of the machine. It will be evident that this arrangement provides for successive movement of the frame and sleeve parts as described in connection with Figure 1 through the stations 2 to 7 as shown therein.

The transverse rod 116, as shown in Figure 4, will be oscillated longitudinally of the machine upon oscillation of the conveyor. However, the rod is not moved vertically due to the fact that it is driven by the pivoted connecting rods 100 and 122 and is mounted in fixed slides 118 and 120. The fingers 128 which extend from the member 124 pivotally mounted on the rod 116 are accorded vertical oscillation along with vertical oscillation of the conveyor by means of their pivotal connection to the bar 125 which rests on the member 80. The shoulders 168 and 282 are accorded only longitudinal oscillation.

Figure 12:
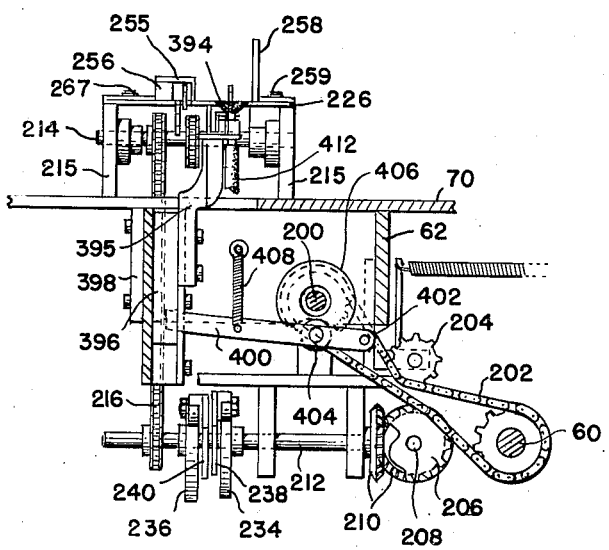
Figure 12 is a fragmentary vertical transverse section through the machine taken on the trace 12—12 shown in Figure 3.

As shown in Figures 4, 7 and 12, a cam shaft 200 extends longitudinally of the machine and is driven by the cam shaft 60 through a chain 202 extending over conventionally mounted sprockets on the cam shafts 60 and 200. The cam shaft 200 is mounted by conventional bearing means mounted on the frame of the machine. The relative positions of the cam shafts 60 and 200 can be readily seen in Figure 12 presenting a vertical transverse section through the machine. An idler sprocket 204 which is conventionally mounted on frame members of the machine serves to properly tension the chain 202. The chain 202 also runs over a sprocket gear 206 which is mounted on a shaft 208 supported on the machine frame by mechanism not shown and on which is also mounted a bevelled gear 210 which is in mesh with a mating bevelled gear mounted on a transversely extending shaft 212 mounted in suitable brackets affixed to the frame structure of the machine.

A short transversely extending shaft 214 mounted between longitudinally extending vertical plates 215 mounted above the top plate 70 of the machine, as shown in Figure 12, is driven from the shaft 212 by means of a chain 216 passing over conventionally mounted sprockets on the shafts 212 and 214.

In Figure 3 there is indicated, generally by the arrow 218, the conveyor referred to in Figure 1 as conveyor 11 for advancing the cellophane packages. This conveyor is shown in section and in elevation in Figure 7 and in plan in Figure 8. The conveyor comprises a pair of endless chains 220 driven by suitable sprockets on the shaft 214 and carried by suitable sprockets on a shaft 222 mounted between the plates 215 toward the input end of the machine from the sprocket on the shaft 212. The chains each have affixed thereto at spaced intervals thereon outstanding fingers 224 which extend upwardly through slots in a plate 226 mounted on the top edges of plates 215 providing a surface over which the cellophane packages are advanced by the conveyor fingers 224.

As the cellophane packages reach the discharge end of the conveyor, the right-hand end as viewed in Figure 7, the packages must be advanced ahead of the conveyor fingers 224 or be carried downwardly by the fingers as they are carried around the sprocket on the shaft 214 with the chains 220. This advance is accomplished by apparatus shown in perspective in Figure 16 and also partially shown in Figures 7 and 8. The arrangement includes three fingers 228, each of which is pivotally mounted on a block 230 which is in turn slidably mounted on a plate 232. The plate 232 extends transversely of the machine and is mounted within the endless chains 220, as best shown in Figure 7, by attachment to the plates 215 supporting the sprocket shaft 214. Springs 229 are connected to the upper left-hand portions of each of the fingers 228, as viewed in Figure 16, and serve to urge the fingers upwardly and to the left as viewed in Figures 16 and 7.

Two cams 234 and 236 are mounted on the shaft 212 and are adapted to actuate cam followers mounted on the ends of generally horizontally extending bars 238 and 240, respectively. The opposite ends of the bars 238 and 240 are pivoted in fixed positions in slots 244 and 245 in the lower ends of a pair of vertically extending members 242 and 246, respectively, which are pivotally mounted in the region intermediate the ends thereof at 248 to the frame of the machine. A pair of rods 250 and 252 have their left-hand ends, as viewed in Figures 8 and 16, pivotally connected to the upper ends of the members 242 and 246, respectively. The right-hand end of the rod 250 is connected to the block 230 and the right-hand end of the rod 252 is connected to a plate 254 which is slidably positioned on top of the block 230 and is adapted to engage the left-hand edge portion of the fingers 228, as viewed in Figure 16, above their pivotal mountings and to cause them to pivot around their pivotal mountings in the block 230 so as to move the upper and outermost end portions of the fingers to the right and downwardly.

The rotation of the cams 234 and 236 is so synchronized with the operation of the conveyor chains 220 and the positions of the fingers 224 thereon and the formation of the cams is such as to cause the block 230 mounting the fingers 228 to move from behind each successive cellophane package being advanced by the conveyor chain fingers 224 more rapidly than the conveyor 220 is moving in order to discharge the package from the conveyor ahead of the finger 224 which, up to that time, was advancing the package. After the fingers 228 have been advanced to their extreme forwardmost position by movement of the block 230 by the rod 250 and the cam 234, the rod 252 which is actuated by the cam 236 causes the plate 254 to move to the right and engage the rear portions of the fingers 228 causing them to move downwardly against the urging of springs 229 whereupon both of the rods 250 and 252 then move to the left as viewed in Figure 16 carrying the downwardly positioned fingers to the left below the upper reach of the conveyor chains 220 whereupon continued rotation of the cam 236 moves the plate 254 to the left permitting the fingers 228 to be raised upwardly by their associated springs 229 behind or to the left of the next cellophane package being advanced by conveyor fingers 224 as viewed in Figure 7. The fingers 228 are then moved to the right by the action of cam 234 and take over the advance of the next cellophane package. The successive cellophane packages delivered from the conveyor chains 220 are received by means providing the transversely extending conveyor system indicated at 15 in Figure 1 as will be hereinafter described.

As previously noted, it is among the objects of the invention to provide a machine for assembling packages of various widths. In order to accommodate cellophane packages of various widths, the conveyor line 11 indicated at 218 in Figure 3 includes a pair of longitudinally extending guide bars 256 and 258 mounted on the plate 226 on the front and rear sides, respectively, of the slots in the plate 226 through which extend the fingers 224 of the conveyor chains 220. The guide bars 256 and 258 are attached to the plate 226 by means of angle members and bolts indicated at 267 and 269, respectively. The angle members indicated at 267 are provided with slots serving to permit adjustment of the guide bar 256 transversely of the conveyor 218 in order to accommodate for cellophane packages of various widths. In the particular embodiment shown there has been additionally provided an angle shaped member 255 attached to the upper surface of the guide bar 256 and extending inwardly and downwardly in a direction to enclose the conveyor fingers 224 extending upwardly from the forward one of the conveyor chains 220. It will be evident that when narrow cellophane packages are run a single set of fingers 224 are sufficient to advance the packages between the guide bars and, when wide packages are run, the angle 255 is removed and the two sets of conveyor fingers serve to advance the cellophane packages.

The apparatus for feeding successive frames 21 from the bottom of the stack into the conveyor line 12 as indicated in Figure 1 will now be described. The right-hand or input end of the apparatus is shown in plan in Figures 3 and 9. In Figure 9 there is shown frames 21 in the location of the stack shown at station 1 in Figure 1. The stack of frame members 21 is positioned on the input side of a transversely and vertically extending plate 260 between the plate 260 and vertically extending guide rods 264. The plate 260 is longitudinally adjustably affixed to the top plate 70 by slotted brackets indicated at 260'. The plate 260 has a pair of vertically extending angles 262 affixed thereto by means of bolts 263 extending through slots in the plate 260. The angles engage the front and rear edges of the frames in the stack. The plate 260 is positionable longitudinally of the top plate 70 and the angles 262 are positionable transversely of the plate 260 and thus the space between the plate 260, the rods 264 and the angles 262 may be adjusted to accommodate frames of various sizes.

The longitudinally movable members 132 previously described in conjunction with the conveyor structure shown in Figure 4 oscillate below the stack of frames in the slots 73 in the top plate 70. As shown in Figure 4, on the upper surface of each of the members 132 there is provided a shoulder 168 adjacent to the discharge end thereof which is adapted to engage the lowermost frame in the stack. The upper surfaces of the members 132 are each covered with a replaceable sheet 133 shown in Figure 10. The discharge ends of the sheets provide the shoulders 168 shown in Figure 4. Two cam discs 270 are mounted on the vertical plate 260 above and slightly inwardly of the two members 132 and adjacent to the discharge side of the stack of frames. Each of the discs 270 is formed with a non-concentric periphery in order that, by rotation of each disc, an adjustable space may be provided between each disc and the adjacent upper and outer edge of the wings of a flat V-shaped plate 272 which will be hereinafter described. The discs thereby facilitate accurate adjustment of the space through which a frame member and only one frame member may be advanced by the shoulder 168 when the members 132 are moved toward the discharge end of the machine.

A guard plate 271 is mounted over the plate 70 adjacent to the stack of frame members and serves to cover the input end portion of the plate 272 which is adjustably mounted on the top of the top plate 70. The plate 272 is in the form of a flat V having the base of the V extending longitudinally of the machine between the members 132 and the wings of the V extending toward the members 132 and the discs 270. By this means there is provided a fixed space below each of the cam discs 270 through which only a single frame can pass. The spacing is not affected by any permanent "V-ing" of the frame member as may occur during the manufacture thereof and serve at this stage to interfere with operation of the feeding of the successive lowermost frame members from the stack thereof.

The individual frame members being fed from the bottom of the stack by members 132 are positioned transversely of the machine by longitudinally extending guide bars 274 and 276 mounted on the plate 70. The guide bar 274 is mounted for adjustment transversely of the machine by slotted mounting plates 275 in order to provide the necessary adjustment required to accommodate frames of various widths. The guide bars 274 and 276 extend from the input side of the plate 260 toward the output end of the machine with the guide bar 276 terminating approximately between the stations 3 and 4.

The sleeve members 22 are fed from a stack in a manner similar to that of the feeding of the frames 21. A stack of sleeve members 22, such as is shown in Figure 9, is held in position on the input side of the plate 260 by vertically extending angle members 278 and 278' and guide posts 280 and 281. The angle 278 is adjustably positioned by bolts 279. The post 280 is adjustably positioned by its mounting on a guide bar 286 which will be hereinafter described. The member 136 described in conjunction with the conveyor system shown in Figure 4 is positioned with a shoulder 282 adjacent to its output end and has its upper surface covered with a replaceable strip 137 extending slightly above the upper surface of the plate 70 and providing the shoulder 282. The shoulder 282 is adapted to engage the lowermost sleeve member of the stack, as shown in Figure 11, and advance the sleeve toward the discharge end of the machine. It should be noted that Figure 11 shows the conveyor member 136 in a retracted position while all of the other figures show the conveyor parts in fully advanced positions. The plate 260 mounts two cam discs 284 the left-hand one of which, as shown in Figure 10, is affixed to the lower end of the angle member 278. The cam discs are positioned on opposite sides of the member 136 and serve to provide adjustable means for establishing the spacing through which successive sleeve members are fed from the bottom of the stack by the shoulder 282 on the member 136.

A pair of guide bars or rails 286 and 288 extending longitudinally of the machine are positioned on either side of the sleeve conveyor line. The guide bar 288 is fixed to the top plate 70 and extends from the input side of plate 260 to the output side of station 3 as will be hereinafter described. The guide bar 286 extends from the input side of the plate 260 and extends to the discharge end of the sleeve conveyor and includes portions numeralled 631 and 709 which will be hereinafter described. The bars 286 and 288 are provided with cut-away portions 286' and 288' in the region of the adjustable positioned plate 260 to provide clearance for the cam disc 284.

Rubber strips 285 are positioned on the top plate 70 between the guide bars 286 and 288 on either side of the member 136. These rubber strips provide surfaces resisting the advance of the lowermost sleeve from the stack until the sleeve is fully engaged by the shoulder 282. This arrangement prevents the lowermost sleeve from advancing prematurely and allowing a second sleeve to deflect downwardly and engage the shoulder 282 and thus be advanced thereby simultaneously with the lowermost sleeve.

The guide bar 286—631—709 is adjustably mounted on the top plate 70 for motion transversely thereof by slotted mounting members 287, 289 and 711 by means of which the sleeve conveyor line may be adjusted to carry sleeves of various widths. This adjustment of the guide bar 286 also positions the post 280 mounted thereon.

A slotted member 291 extends longitudinally of the machine from the plate 260 toward the discharge end of the machine and is spaced above the top plate 70 between the conveyor slots 73. A similar member 293 extends from the plate 260 between the conveyor guides 286 and 288 of the sleeve conveyor line. The members 291 and 293 are most clearly shown in Figures 9, 10 and 11. The slots in the members 291 and 293 extend vertically therein and are adapted to receive rollers 295. The portions of the members adjacent to each side of the longitudinally extending slots are provided with transverse grooves 299 adapted to receive axles 297 of the rollers 295 by which the rollers 295 are supported therein. The arrangement of the member 291 and its roller 295 is such that the rollers bear upon the frames 21 as they pass thereunder serving to apply a light yielding downward pressure on the members sufficient to hold the members in engagement with the shoulders 168 of the members 132 as the frames are advanced for a sufficient distance by the members 132 to be engageable by the fingers 128 on the arms 126 during the next cycle of operation of the conveyor. Similarly, the rolls 295 in the slot in the member 293 provide a yielding downward force upon the sleeve members carried out from below the stack by the shoulder 282 on the member 136 and serve to hold the sleeve member in engagement with the shoulder 282 to insure the full advance of the sleeve member to a position in which it can be engaged by the fingers 114 on the plate 111 shown in Figure 4 during the next cycle of operation of the conveyors.

From the foregoing it will be noted that the frame members which are adapted to fold along a longitudinal center line are fed outwardly from the stack thereof through means providing adjustable vertical spaces which are positioned a fixed distance on either side of the center line of the frame conveyor. The transverse space through which the frames are passed is adjustable in width to provide for frames of various widths and this adjustability is accomplished by moving both of the conveyor guide rails. Thus the frame members regardless of width are always positioned on a fixed center line. In comparison with this, it will be noted that the sleeve members which may possibly bow upwardly or downwardly are fed from the bottom of a stack thereof through means providing adjustable vertical spaces positioned adjacent to the forward and rearward edges of the sleeves. When the width of the conveyor is to be changed to carry sleeves of various sizes, the guide rail along the rear side of the sleeve conveyor remains fixed and the guide rail along the front side of the sleeve conveyor and the means adjacent thereto providing the adjustable vertical space through which sleeves are fed from the stack thereof is positioned with the adjustable rail.

As has been described in connection with Figure 1, the frames upon their advance from station 1 successively from the bottom of the stack are, in station 2, positioned so as to have the portions thereof indicated at 28 in Figure 1 removed therefrom. As shown in Figures 9 and 14, a stop member 303 has one end pivotally mounted on the discharge end of the member 291 extending over the frame conveyor and has its discharge end formed to engage the leading or discharge side of a frame advanced by the shoulders 168 of the members 132. The stop member 303 serves to arrest the motion of the frame at the forwardmost point of travel provided by the shoulders 168. Thus the frame is positioned immediately under the knock-out punch blocks 292 which will now be described. As shown in Figure 3 and in greater detail in Figures 14 and 15, a plate 290 is positioned above top plate 70 and supports a plurality of downwardly extending punch blocks 292 which are adapted to press against the portions of the frames to be removed therefrom. The plate 290 is supported by means of a pair of vertically extending posts 294, the lower ends of which are attached to a stirrup frame member 296. As is shown most clearly in Figures 4 and 15, the stirrup frame 296 lies on a horizontal plane and has its arms pivoted to the frame plate 66 at the input end of the machine.

A cam follower 300 is attached to the base of the stirrup member 296, as shown in Figure 15, and is adapted to ride on a cam 302 mounted on the cam shaft 58. The stud on which the cam follower 300 is mounted is adapted to ride in a vertically extending slot 301 in a plate 304 which is affixed to the frame of the machine. The provision of the slotted plate 304 serves to guide the bottom of the stirrup frame 296 in vertical motion and to prevent horizontal motion thereof transversely of the machine. This insures proper positioning of the punch blocks 292 which are affixed to the plate 290. The position of the cam 302 on the cam shaft 58 is such as to permit the punch blocks 292 and the plate 290 to drop downwardly by their own weight when each successive frame has been properly positioned in station 2 as the result of the furthermost advance of the shoulders 168 on the members 132. During the punching operation, the frame being punched is supported by the web 70' of the top plate 70 separating the cutouts 71 and 71' therein and by support bars 297 extending longitudinally of the machine through the cutouts 71 and 71', respectively, supported in recesses 299 in the top plate 70 to provide support under the outer edge portions of the frame 21 as shown in Figure 15. The bars 297 are adjustably mounted in order to be positionable transversely of the machine to accommodate frames of various widths. The plate 290 is replaceable and may be replaced with plates supporting various numbers of punch blocks 292 which are variously positioned to accommodate any particular arrangement of cutouts as may be required for various frames.

The cam 302 is so formed as to permit the plate 290 and the punches 292 affixed thereto to drop downwardly for a relatively short period during the return stroke of the various conveyor fingers and to raise the plate 290 to the position shown in Figure 15 prior to the next forward motion of the conveyor which serves to move the punched frame out of position from under the plate 290 into the next station and to move a next succeeding frame into position under the plate 290.

Safety apparatus is provided in conjunction with the knock-out assembly as shown in Figure 15 in the form of a pair of contact blades 308 and 310 each of which is mounted to an insulating block 306 attached to the framework of the machine. The contact arms 308 and 310 are positioned to be contacted by the upper and lower ends, respectively, of a contact pin 312 mounted to a rearwardly turned angle member attached to the stirrup 296 as viewed in Figure 15.

When the stirrup member is in the upper position, the contact pin 312 will engage the blade 308. During normal operation of the knock-out assembly, studs 293 extending downwardly from the plate 290 engage the upper surface of the frame member positioned thereunder, thus limiting the extent of downward motion of the plate 290, the stirrup member 296 and the contact pin 312. Under this condition the ends of the pin 312 do not engage either blade 310 or blade 308. On the other hand, in the event that no frame is in position below the knock-out apparatus, the stirrup member is free to move downwardly to a sufficient extent so that the lower end of the pin 312 does engage the blade 310 and if the punch blocks do not pass through a frame contact 308—312 does not open. The operation of the electrical circuit provided in conjunction with the contact blades 308 and 310 and the contact pin 312 will be hereinafter described.

In station 3 the cardboard frame 21 is folded about the weakened fold line 26 as shown in Figure 1. At this station, as best shown in Figures 3 and 14, there is provided a longitudinally extending bar 314 which is positioned above the conveyor by arms 316 at a sufficient distance to permit frame members 21 to pass thereunder. The arms 316 extend from the front of the machine and the rearward edge of the bar 314 is so positioned as to be over the weakened line 26 of each frame member passing thereunder. Immediately to the rear of the bar 314 there is provided a slot in the top plate 70 through which a pair of vertically movable blades 318 and 320 are adapted to rise.

Figure 17:
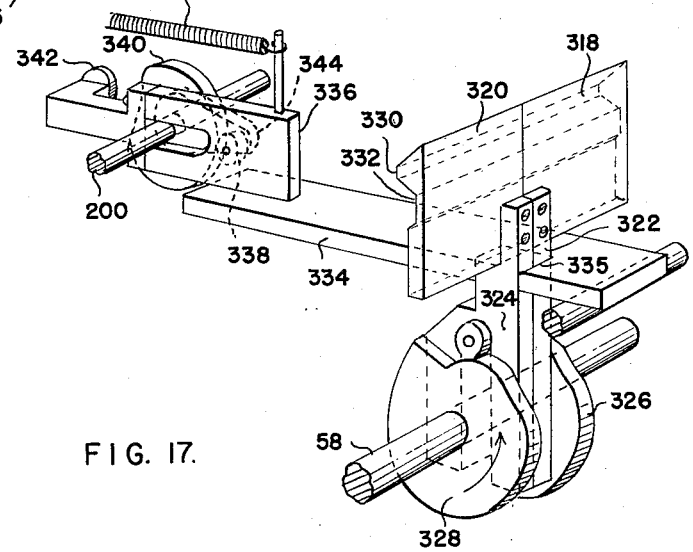
Figure 17 is a perspective view of a portion of the machine shown in Figure 14.

The blades 318 and 320 are supported by vertically movable members 322 and 324, respectively, as is best shown in Figure 17. The members 322 and 324 each mount a cam follower which is adapted to ride on a cam 326 and 328, respectively, mounted on the cam shaft 58. The blades 318 and 320 are each provided adjacent to their upper edges with a longitudinally extending portion 330 which protrudes toward the front of the machine and a longitudinally extending recess 332 immediately below the protruding portion.

A horizontal transversely extending plate 334 is recessed adjacent to its rearward end as indicated at 335 and provides horizontal positioning means for the vertically extending plate support members 322 and 324. The forward or left-hand end of the plate 334, as viewed in Figure 17, has attached thereto an upstanding plate 336 which mounts a cam follower 338 adapted to engage a cam 340 on the cam shaft 200. Action of the cam 340 upon the follower 338 will cause the plate 334 to move to the right as viewed in Figure 17. An additional cam follower 342 is mounted at the left-hand end of the plate 336 and is adapted to engage a cam 344 also mounted on the cam shaft 200. A spring 346 connected between the plate 336 and the frame of the machine urges the plate 336 toward the front of the machine.

The arrangement of the spring 346, the cams 340 and 344, and the cams 326 and 328 is such as to actuate the blades 318 and 320 to cause bending of the frame in station 3 as shown in Figure 1. This bending is accomplished upon a frame 21 in the station 3 by the blade 318 and the blade 320 rising upwardly in under a frame 21 in response to the action of the cams 326 and 328 and then moving toward the forward side of the machine in response to action of the spring 346 and ultimately by the cam 344 which positions the blades 318 and 320 with the protruding portion 330 therein positioned over the stationary bar 314 and with the recess 332 of the blades 318 and 320 spaced from the bar 314 a sufficient distance to provide clearance for a frame 21. It will be evident that the horizontal motion of the blades 318 and 320 will cause a final bending or creasing of the frame member about its bend line 26. It should be noted that while the spring 346 in most cases supplies all of the force required to form the frame members, the cam is so arranged as to prevent incomplete bending from occurring. Even in this event, however, the ultimate motion is provided by the spring and thus the possibility of jamming or other accident occurring in this bending station is minimized.

Upon completion of the frame bending operation in station 3, the frame conveyor fingers 112 move the frame members from station 3 to station 4. As the frame member is advanced from station 3 to station 4, the operation of the cams 326 and 328 is such that the blade 318 is first dropped to permit entry of the next successive frame in station 3 while the blade 320 remains upstanding to position the bent portion of the frame vertically upwardly as the frame is advanced to station 4 at which position the vertically upstanding portion of the frame is held in position by a guide bar 593 below a plate 348.

Figure 18:
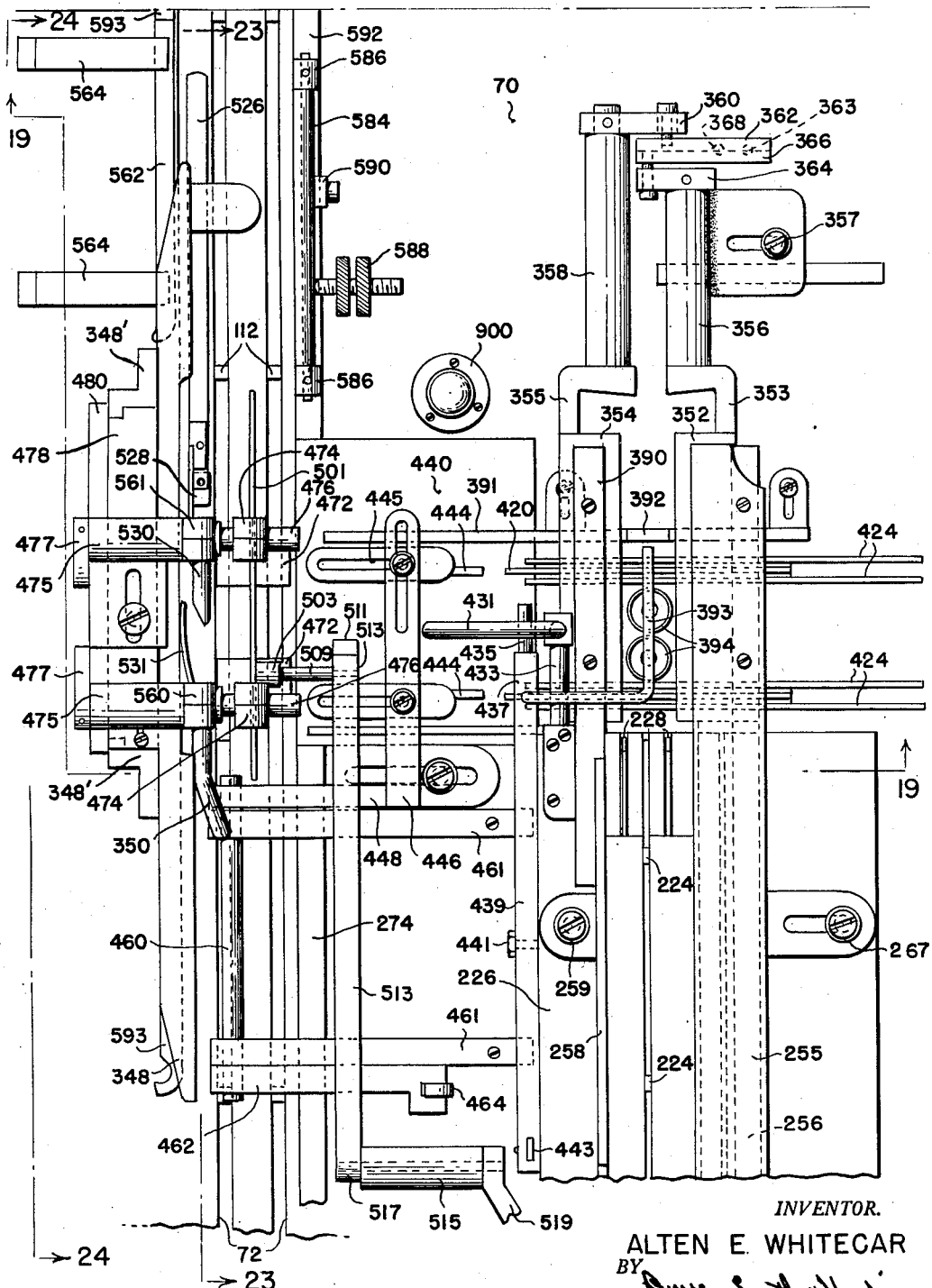
Figure 18 is an enlarged fragmentary plan view of the top of the machine showing the portion thereof adjoining the output end of the portion shown in Figure 14.

No operations are performed on the frame while in station 4 and the frame is thereafter moved by the frame conveyor to station 5. In station 5 as best shown in Figure 18 there is an additional guide bar 350 positioned adjacent to and spaced from the guide plate 348 between which the upstanding flange of the frame is adapted to pass. The guide plate 348 and bar 350 retain the flange in upstanding position in station 5. It is while the frame is held in this position that a cellophane capsule package is adapted to be inserted therein. The mechanism for accomplishing this insertion can now be described.

Figure 16:
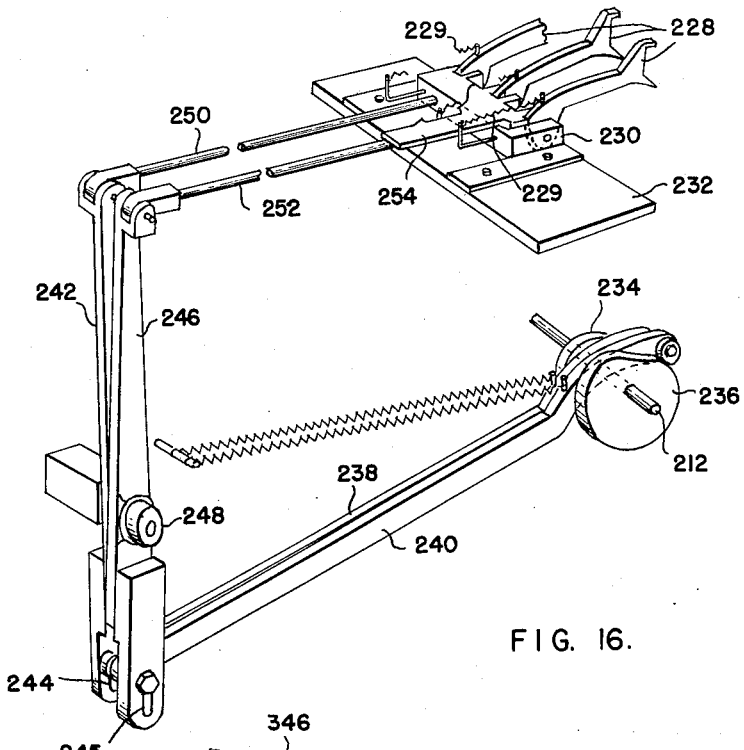
Figure 16 is a perspective view of a portion of the machine shown in Figures 7 and 8.
Figure 20:
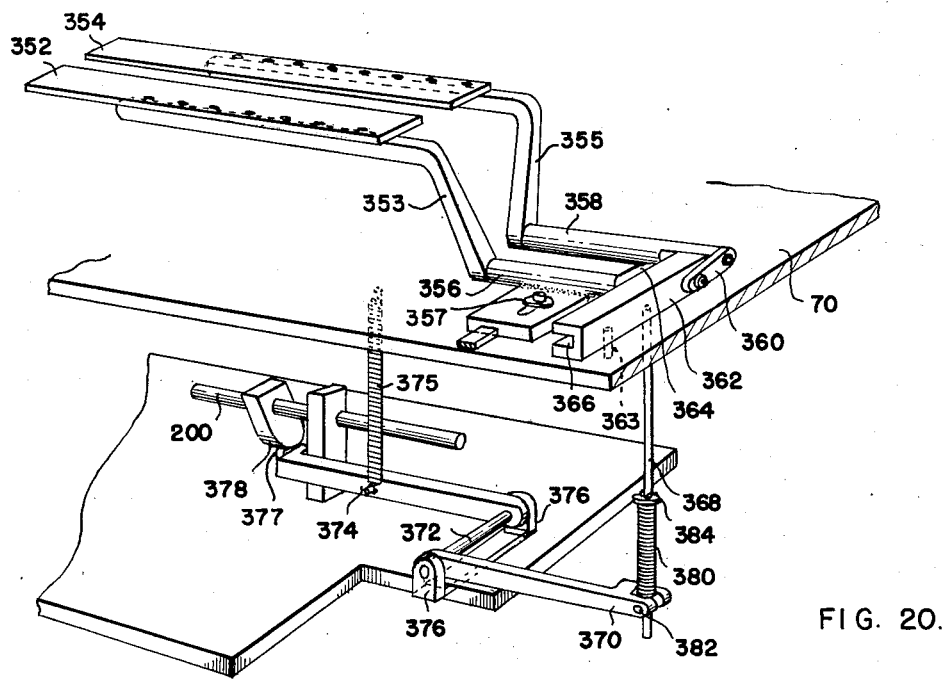
Figure 20 is a perspective view of a portion of the machine shown in Figure 18.

As previously described, the cellophane capsule packages are carried down the cellophane package conveyor to a position adjacent to station 5 whereat, by the action of fingers 228 shown in Figure 16, the packages are advanced ahead of the conveyor fingers and delivered to station 5 position. In this position the cellophane packages come to rest upon a pair of transversely spaced longitudinally extending horizontal blades 352, 354 which are shown in Figures 3, 18 and 20. These blades are attached to arms 353 and 355, respectively, forming shafts passing through guide bushings 356 and 358, respectively, mounted on the top plate 70 of the machine, the guide bushing 356 being adjustably positioned by the slotted plate and bolt arrangement 357. The shaft passing through the guide bushing 358 has affixed to its end a horizontally extending slotted link 360 which is pivotally connected to a block 362. The shaft extending through the guide 356 is provided with a horizontally extending link 364 which extends toward the link 360 but on the opposite side of the block 362 therefrom and is provided with a roller follower adapted to ride in a horizontally extending slot 366 within the block 362.

A vertically extending rod 368 has its upper end attached to the block 362. A pin 382 mounted in the right-hand end of a horizontally extending rod 370 passes through a slot in the lower end of rod 368. A spring 380 is positioned between the pin 382 and a washer 384 affixed to the rod 368. The other end of the rod 370 is connected through a shaft 372 to one end of a horizontally extending bar 374. The rod 372 is rotatably mounted at 376 to the frame of the machine. The other end of the bar 374 mounts a cam follower 377 adapted to ride against a cam 378 affixed to the cam shaft 200. A spring 375 urges the bar 374 upwardly and holds the block 362 against the top plate 70 except when the rise of the cam 378 engages the cam follower 377.

This arrangement is such that rotation of the cam shaft 200 will cause the rod 368 to oscillate upwardly and downwardly thereby causing the block 362 to oscillate upwardly and downwardly on a guide pin 363 affixed to the plate 70 and extending into a bore in the block 362. This motion results in an opening and closing motion of the two blades 352 and 354. It will be evident that if a cellophane capsule package has been delivered to the two blades, upon separation of the blades the package will be permitted to drop downwardly therethrough.

Referring to Figures 3 and 18 it will be noted that the cellophane package conveyor is provided with a pair of guides 255 and 258 extending longitudinally of and on either side of the conveyor in order to position the cellophane package therein. The front guide 255 extends over the blade 352 in station 5 and thus provides a front guide for the cellophane packages in station 5. The guide 258 is provided with an extension 390 at the output or left-hand end thereof, as viewed in Figure 3, which serves to guide the cellophane packages over the plate 354 in position 5. An end stop 392 is provided in order to stop the cellophane packages which are delivered from the conveyor by the fingers 228. The stop 392 extends upwardly from a plate 391 extending transversely of the machine and adjustably mounted on the top plate 70. It will be evident that the guides 255 and 390 and the stop 392 are effective to position the tablet packages over the horizontal blades 352 and 354. A formed wire member 393 is affixed to the end portion 437 of an arm 439 which is oscillated upwardly and downwardly as will be hereinafter described. The wire 393 is positioned above the positioned cellophane package above the blades 352 and 354 when the cellophane package is delivered thereto and moves downwardly to hold the package on the blades 352 and 354 when the suction cups 394 which will now be described move upwardly and engage the package.

As will be seen in Figures 3 and 18, suction cups 394 are positioned below and generally between the blades 352 and 354. The cups are attached to a vertically extending member 395, shown in Figure 12, the lower end of which is affixed to a member 396 vertically slidable in a stationary frame mounting member 398. The lower end of the member 396 is recessed to receive an arm 400 which is pivotally mounted at 402 to the frame of the machine and mounts a cam follower 404 which is adapted to ride on the surface of the cam 406 affixed to the cam shaft 200. A spring 408 is arranged to urge the arm 400 upwardly and the cam acts to urge the arm 400 downwardly. It will be evident that in response to rotation of the cam 406 with the shaft 200, the suction cups 394 will be moved upwardly and downwardly. At the uppermost position of the suction cups they are positioned to engage a cellophane package supported by the blades 352 and 354. The cups are timed to be in an uppermost position when the blades 352 and 354 are separated.

Figure 42:
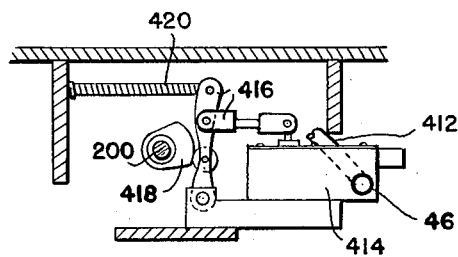
Figure 42 is a fragmentary transverse vertical section through the machine taken on the trace 42—42 shown in Figure 7.

A vacuum line 412 is attached to the suction cups 394 and extends downwardly to a vacuum control valve 414 shown in Figures 7 and 42. The vacuum control valve 414 is actuated through a pair of links 416 by a cam 418 mounted on the cam shaft 200. The links are moved to the right, as viewed in Figure 42, by the action of the cam 418 and to the left, as viewed in Figure 42, by a return spring 420. The cam 418 is so formed as to provide valve actuation and connection of the suction cups 394 to the vacuum reservoir through the vacuum lines 412 and 46 to provide vacuum at the suction cups during the interval of motion of the cups from their uppermost position to their lower position during which time they are carrying a cellophane package downwardly from the blades 352 and 354 whose operation is so timed that the blades separate upon the arrival of the suction cups at their uppermost position.

Figure 22:
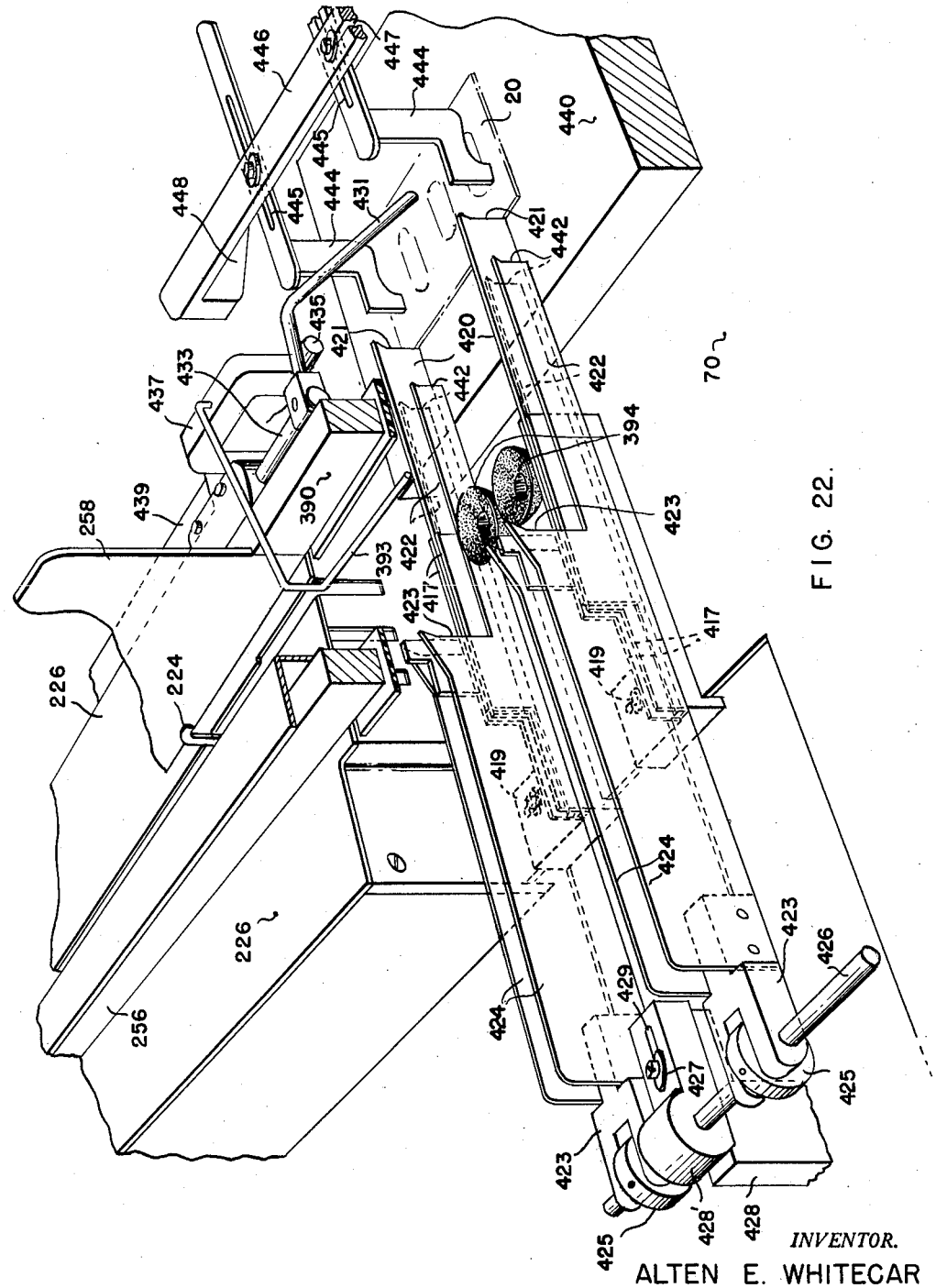
Figure 22 is a perspective view of a portion of the machine shown in Figures 18 and 19.

Positioned below the suction cups 394 and adjacent to each side thereof, as is best shown in Figure 22, is a vertically positioned horizontal transversely extending stationary blade 420. Each of the stationary blades 420 is clamped between a pair of blades 417. Each of the two pairs of clamping blades 417 is affixed to the top plate 70 by means of a bolt passing through a slotted plate as indicated at 419. It will be evident that by this arrangement the blades 420 are positionable transversely of the machine and that the spacing between the blades 420 may also be adjusted.

On either side of each of the two stationary blades 420 and spaced therefrom is a vertically positioned transversely extending movable blade 422—424. The portion 424 of each of the four blades 422—42 extending toward the front of the machine is of greater vertical depth than the portions 22 extending toward the rear of the machine.

The extreme forward ends of the pairs of blades 424, i.e., the left-hand ends as viewed in Figure 22, are each attached to a clevis 423 which is pivotally mounted on a longitudinally extending pivot rod 426 which passes through a vtting 428' affixed to the upper end of a vertically extending member 428 by means of a bolt 427 extending through a slot 429 in the fitting 428'. Each of the clevises 423 is located on the rod 426 by means of a disc 425 affixed to the rod 426 between the forks of each of the clevises. This arrangement provides for adjustment of the space between the two bars or blades 422—424 which is adjusted to be in accordance with the spacing between the stationary blades 420. The position of the movable blades 422—424 transversely of the machine is adjusted by means of the bolt 427 in the slot 429 in the fitting 428'. From the foregoing it will be evident that the arrangement of blades described is adjustable to accommodate cellophane packages of various widths and lengths.

Figure 13:
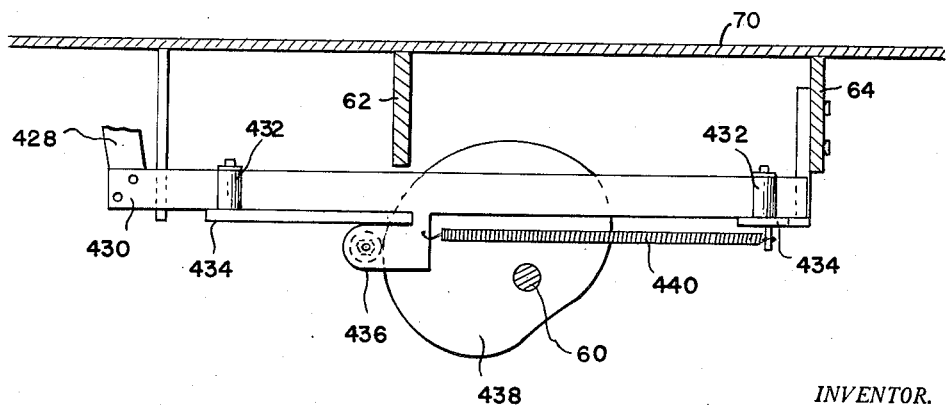
Figure 13 is a fragmentary transverse vertical section through the machine taken on the trace 13—13 shown in Figure 2.

The lower end of the member 428, as shown in Figure 13, is affixed to a transversely extending slidable bar 430. The bar 430 is adapted to slide transversely of the machine between guide members 432 and on machine frame plates 434. A cam follower 436 is affixed to the slide bar 430 and is adapted to ride on the surface of a cam 438 mounted on the cam shaft 60. A return spring 440 is connected between the slide bar 430 and the machine frame and serves to retain the cam follower in engagement with the surface of the cam 438.

The formation of the cam 438 is such that upon each rotation of the cam shaft 60 the horizontal transversely extending blades 422—424 will oscillate transversely of the machine through one cycle of motion. The cam 438 is so timed with respect to the suction cup operating cam 406 as to position the blades 422 in the position shown in Figure 22 while the suction cups are coming down. Thus the cellophane capsule package carried downwardly by the suction cups is positioned above the lower or rearward portion of the blades 422. The vacuum control valve cam 418 is timed so as to shut off the vacuum from the vacuum cups during the downward motion of the vacuum cups at the time the cellophane package comes to rest upon the upper surfaces of the stationary blades 420.

The rearward of right-hand ends of the blades 420 as viewed in Figure 22 rest upon a plate 440 mounted on the top plate 70. It will be evident that upon rearward transverse motion of the movable blades 422—424 the capsule package will be advanced toward the rear of the machine or to the right, as viewed in Figure 22, by abutments 423 formed between the portions 422 and 424 of the movable blades and drop over the rearward ends 421 of the blades 420 upon the blades 422. Upon the next forward motion of the blades 422 the package will engage the ends 421 of the blades 420 and drop upon the plate 440 when the blades 442 are returned to their forward position shown in Figure 22.

To insure the dropping down of the cellophane package over the ends of the blades 420 and 422, a pair of hold down fingers 444 is provided. These fingers as best shown in Figures 22 and 18 are provided with slotted portions 445 bolted to a longitudinaly extending member 446 which is formed with a transversely extending portion 448 attached to one end of a longitudinally extending rod 460 which is pivotally mounted above the top plate 70 and the frame conveyor by arms 461 affixed to the top plate 70. A transversely extending member 462 has its rear end affixed to the other end of the rod 460 and its front end pivoted in a slot in the upper end of a vertically extending rod 464. As shown in Figures 7 and 29, the lower end of the rod 464 mounts a wedge nut 465 which is adapted to seat in a groove in one end of an arm 466 which extends transversely of the machine and has its other end pivoted to the machine frame at 467. The arm 466 mounts a cam follower which is adapted to ride over the surface of a cam 470 mounted on the cam shaft 200.

The formation and timing of the cam 470 is such as to provide a first downward movement of the fingers 444 to a degree sufficient to hold a cellophane package downwardly on the upper surfaces of the movable blades 422 and below the abutment 421 on the stationary blades 420 while the movable blades are being retracted toward the front of the machine. Thereafter, when the movable blades advance toward the rear of the machine, the fingers 444 are further depressed to hold the cellophane package in the position shown in Figure 22 in readiness to be engaged by the ends 442 of the movable blades 422 and advanced into a waiting cardboard frame which has been positioned in station 5 by conveyor fingers 112 previously described.

It will be evident that the slotted portions 445 of the hold down fingers 444 and a slot 447 in the member 446 provide for adjustment of the positioning of the fingers 444 transversely of the machine and in spaced relation with each other in order to accommodate for cellophane packages of various sizes.

A wire contact finger 431 is rotatably mounted on a horizontally extending post of insulating mateiral 433 mounted on the top plate 226 of the cellophane conveyor assembly. The finger is arranged to fall downwardly by its own weight and have its lowermost and outermost end contact the plate 440 when there is no cellophane package lying thereon. The contact finger 431 is adapted to be raised upwardly by an insulated member 435 affixed to an end portion 437 attached to one end of an arm 439. The arm 439 extends longitudinally of the machine and is pivoted intermediate its ends at 441 to the rear plate 215 of the cellophane conveyor housing. The opposite end of the arm 439 is pivotally connected to the upper end of a link 443. As shown in Figure 30, the lower end of the link 443 is affixed to the upper end of an angle shaped member 445 having a downwardly extending leg the lower end of which is pivotally connected at 451 to one end of a link 445', the other end of which is pivotally mounted to shaft 866. A cam follower 447 is mounted on the link 445' and is urged by a spring 451' to ride on a cam 449 mounted on the cam shaft 200.

It will be evident from the foregoing that rotation of the cam 449 will serve not only to oscillate the wire formed member 393 previously described in connection with the position of packages on the blades 352 and 354 shown in Figure 18, but also to raise the insulated pin 435 and raise the contact wire 431 upwardly. The weight of the wire 431 is such that, upon rotation of the cam when the cam follower is urged downwardly and the insulated pin 435 moves downwardly, the contact wire 431 will fall downwardly into engagement with the plate 440. When there is no cellophane package positioned between the arm 431 and the plate 440, operation of a control system which will be hereinafter described arrests the operation of the machine. It is sufficient to note at this time that the cam 449 is so positioned as to permit the contact wire 431 to move downwardly for a brief interval during the time in which a cellophane package 20 should be positioned as shown in Figure 22.

Figure 19:
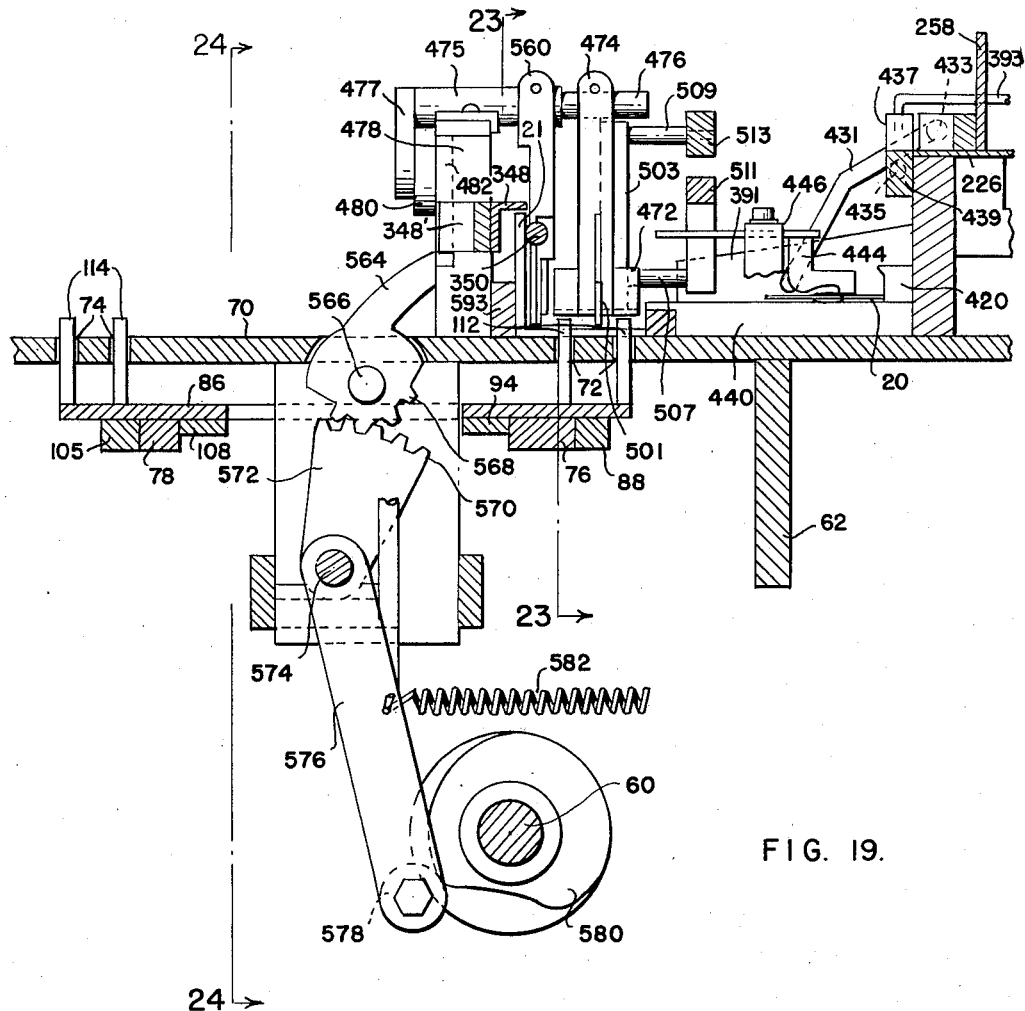
Figure 19 is a fragmentary transverse vertical section through the machine taken on the trace 19—19 shown in Figures 2 and 18.
Figure 23:
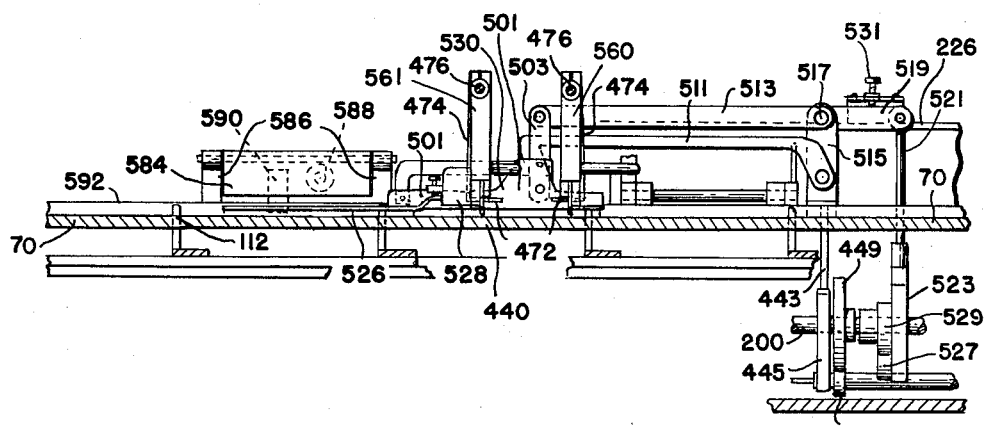
Figure 23 is a fragmentary longitudinal vertical section through the machine taken on the trace 23—23 shown in Figure 18.
Figure 24:
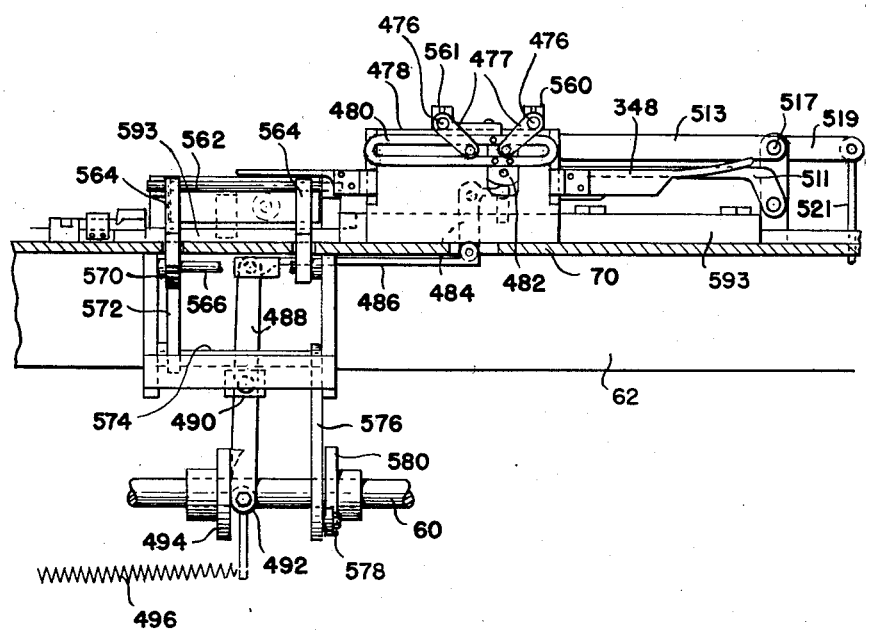
Figure 24 is a fragmentary longitudinal vertical section through the machine taken on the trace 24—24 shown in Figure 18.

In order to insure proper entry of the cellophane package into the frame in station 5, a pair of receiver plates 472, best shown in Figures 23, 19 and 18, is provided below the level of the top of plate 440 and upon which the cellophane package is delivered by the ends 442 of the movable blades 422 upon the completion of the transverse motion of the blades 422. The receiver plates 472 are affixed to the lower ends of vertically extending arms 474, the upper ends of which are attached to the forward ends of transversely extending shafts 476 which are rotatably mounted in sleeves 475 attached to the upper edge of a plate 478 extending upwardly from the top plate 70 of the machine. Each of the shafts 476 as best shown in Figure 24 has one end of a link 477 attached to its rearward end. The other end of each link mounts a follower engaged in a longitudinally extending slotted plate 480. The slotted plate 480 is affixed to a block 482 which is adapted to move vertically in a slot within the plate 478. A bell crank 484 is pivoted to the plate 478 and has one end in engagement with the block 482 and its other end pivotally connected to one end of a longitudinally extending rod 486. The other end of the rod 486 is pivotally connected to the upper end of a vertically extending member 488 which has its central portion pivoted at 490 to the frame of the machine and its lowermost end mounting a cam follower 492 adapted to ride on cam 494 affixed to the cam shaft 60. A spring 496 extending between the lower end of the member 488 and a portion of the machine frame holds the cam follower 492 into firm engagement with the cam 494.

It will be evident that upon rotation of the cam shaft 60 and oscillation of the member 488 about its pivot 490, the holding plates 472 will be moved toward each other and then apart repeatedly and the cam is so timed as to provide separation of the holding plates 472 after the cellophane package is substantially completely positioned on the plates 472. This insures a dropping of the cellophane package in a plane position and avoids the possibility of the cellophane package tipping as it rides off the plate 440 into the waiting frame and the resulting possibility of edges of the cellophane package engaging the edges of the cutout portions of the frame and thereby causing jamming of the machine.

In order to insure prompt dropping of the cellophane package from the plates 472 when they are separated by the mechanism just described, a longitudinally extending vertical plate 501 is provided which is supported by rigid attachment to a vertically extending member 503. A rod 507 shown in Figure 19 extends toward the front of the machine from the lower end of the member 503 and serves as a pivotal connection to the discharge end of a longitudinally extending link 511. A rod 509 extends from the upper end of the member 503 toward the front of the machine and serves as a pivotal connection to the discharge end of a longitudinally extending link 513. The input or right-hand ends of the links 511 and 513, as viewed in Figure 23, are supported by a block 515 mounted on the top plate 70. The link 511 is pivoted to the block 515 and the link 513 is rigidly connected to a shaft 517 which extends through the block 515 toward the front of the machine. The front end of the shaft 517 is rigidly connected to one end of an arm 519, the other end of which is connected to the upper end of a downwardly extending rod 521 which passes through the top plate 70. The lowermost end of the rod 521, as shown in Figure 31, is connected to a block 523 which is provided with a slot 525 through which the cam shaft 200 passes. A cam follower 527 is mounted on the lower end of the block 523 and is adapted to engage the surface of a cam 529.

The weight of the links 511 and 513 and of the blade 501 is sufficient to hold the cam follower 527 into engagement with the cam 529. An adjusting screw 531 is mounted on the plate 226, as shown in Figures 1 and 23, and serves to limit the upward motion of the rod 521 and thus the downward motion of the blade 501. The screw 531 serves as a convenient means for adjusting the lowermost position of the hold down blade 501 as may be required when different capsule or tablet packages are run through the machine. The two arms 511 and 513 and their pivotal end connections provide for vertical rather than arcuate lifting motion of the blade 501.

Figure 25:
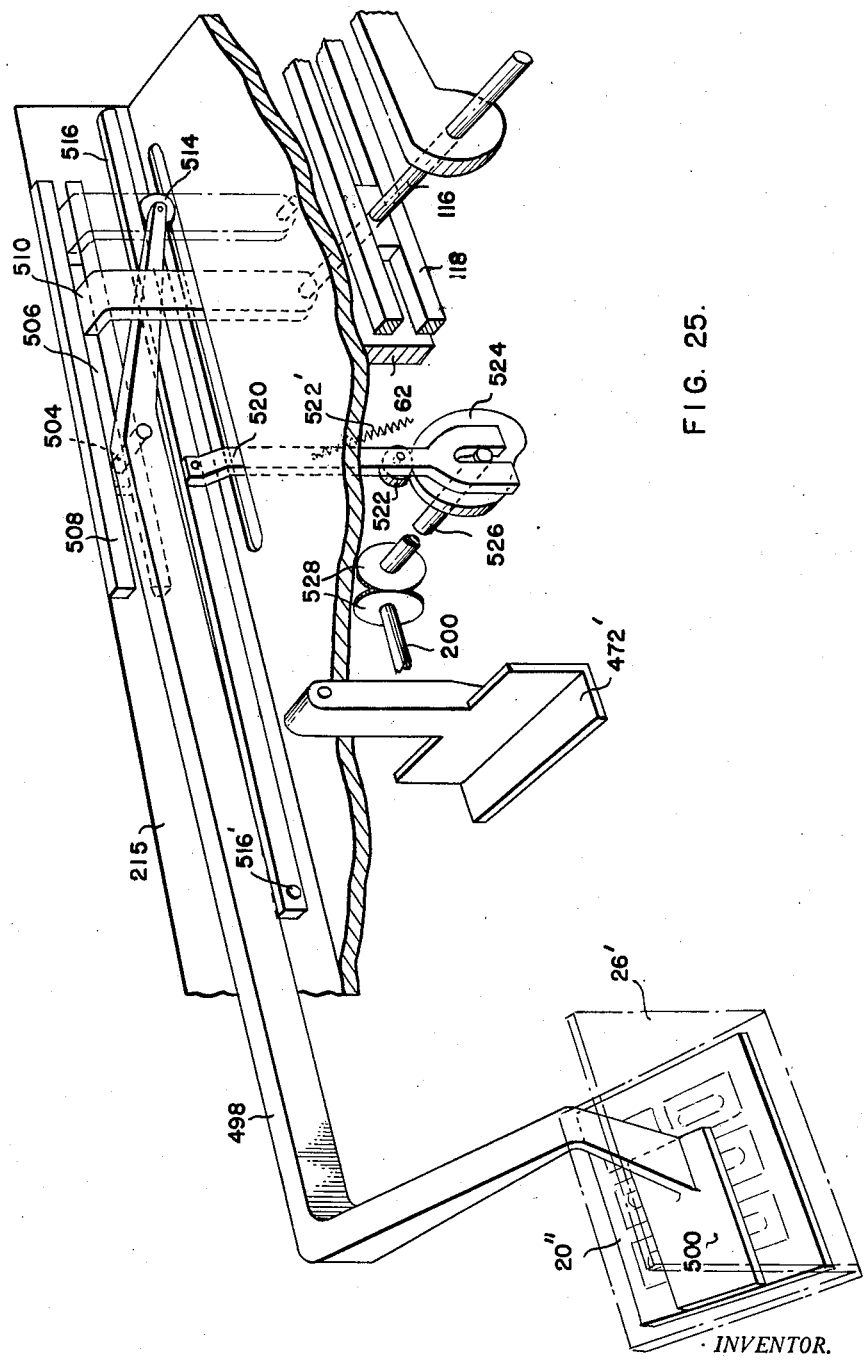
Figure 25 is a perspective view of a modified form of a portion of the apparatus shown in Figure 18.

An alternative form of hold down mechanism desirably employed for example, when a large cellophane package such as shown at 20″ in Figure 25 is to be positioned in a large frame 26′ is shown in Figure 25. In the arrangement shown in Figure 25, only a single plate 472 is employed as indicated at 472′. Instead of a blade, such as shown at 501 in Figure 23, there is employed a flat foot or plate 500 which is affixed to an upwardly and forwardly extending arm 498 which then extends toward the input end of the machine. The arm 498 is mounted on the pivot rod 504 which is affixed to a slider 506 mounted between a pair of guide bars 508 affixed to the plate 215 previously described in connection with the cellophane conveyor housing. A downwardly extending plate 510 is affixed to the right-hand end of the slider 506 as shown in Figure 25 and is connected at its lowermost end to the transversely extending oscillating shaft 116 described in connection with the conveyor system in Figure 4.

The right-hand most end of the member 498, as viewed in Figure 25, mounts a roller 514 which is held upwardly by the weight of the left-hand end portion of the member 498 and into engagement with the underside of a bar 516 which is pivotally connected at its extreme left-hand end at 516′ to the plate 215. The upper end of a downwardly extending member 520 is pivotally connected to the link 516 and mounts at its lower end a cam follower 522 urged by a spring 522′ to engage the surface of a cam 524 mounted on a shaft 526 extending transversely of the machine supported by conventional brackets not shown. A bevelled gear 528 mounted on the forward end of the shaft 526 is adapted to mesh with a mating bevelled gear 528 mounted on the cam shaft 200.

From the foregoing it will be evident that as the conveyor mechanism and the rod 116 oscillate longitudinally of the machine the plate 500 will also oscillate. The cam 524 is so arranged as to provide for movement of the plate 500 downwardly into engagement with the cellophane package as the cellophane package and the frame within which it is positioned are advanced from station 5 to station 6. The cam then serves to raise the plate 500 free of the cellophane package as the conveyor and the plate are retracted back to the station 5 position.

In order to insure proper positioning of the upstanding portion of the frame in station 5 and when the frame is moving through station 5 in addition to the guide bar 350, previously described, which is mounted on the member 560 extending downwardly from the sleeve 475 toward the input end of the machine as shown in Figure 18, a leaf 531 of spring steel extends toward the discharge end of the machine from the member 560 and serves to press the upstanding flap of the frame back against the guide bar 593. A member 561 extending downwardly from the sleeve 475 toward the output end of the machine mounts a guide bar 530 which extends toward the input end of the machine therefrom, as viewed in Figure 18, and guides the upstanding portions of the frame members 21 as shown in Figure 19. The member 561 also mounts a plate 528 to which there is affixed a flexible spring leaf 526 as shown in Figures 18 and 23. The flexible spring leaf 526 extends toward the discharge end of the machine and lays in a horizontal position. The spring serves to press the cellophane package down on the frame with which it is assembled and is relatively thin, thus permitting the frame to be closed around it in station 6 to which it extends.

As will become apparent upon viewing Figures 18 and 23, the plate 501 serves to hold the cellophane package in the frame during movement of the frame from station 5 toward station 6 until after the leaf spring 526 is effective to hold the cellophane package in position on the frame. Thus the cellophane package is retained in position on the frame from the time it is first positioned therein until the frame member is closed around the cellophane package as will now be described.

As shown in Figures 3, 18, 19, 23 and 24, the closure of the frame member holding the capsule package is accomplished in station 6 by means of a bar 562 supported on the rear side of the frame conveyor by means of a pair of arms 564 which pass rearwardly and downwardly through the top plate of the machine and are mounted on a rod 566 rotatably mounted below the top plate of the machine. The lowermost end surface of one of the arms 564 is provided with gear teeth 568 adapted to mesh with teeth 570 formed in the upper end portion of the member 572 which is affixed to a rotatably mounted longitudinally extending shaft 574. A downwardly extending arm 576 is also affixed to the shaft 574 and supports at its lower end a cam follower 578 which is urged against the surface of a cam 580 mounted on the cam shaft 60 by a spring 582.

The cam 580 is so formed as to permit the spring 582 to urge the bar 562 and the upstanding portion of the frame member downwardly and to thereafter lift the bar 562 under positive drive by the cam. The cam rotates once with each cycle of the machine and is so arranged to permit the folding action to occur after each advance of the conveyor mechanism.

In station 6, the frame member is positioned between the guide bar 592 which extends along the front side of the frame conveyor from the plate 440 toward the discharge end of the conveyor and a guide bar 593 which extends from the input portion of station 4 along the rear side of the frame conveyor to the discharge end of station 6. The guide bar 593 is of reduced height in station 6 to provide clearance for the closing arms 564. The guide bar 593′ which extends through station 7 is tapered to provide a minimum space between the guide bars for the passage of frames at the discharge end of the frame conveyor immediately prior to the entry of the frame into a sleeve as shown in Figure 35 and as will be hereinafter described.

On the opposite side of the frame conveyor from the bar 562 a vertically positioned longitudinally extending plate 584 is suspended from a pair of upstanding support brackets 586 which are pivotally connected to each end of the plate and are mounted on the guide bar 592. A threaded stem mounting a counterweight, as indicated at 588, is affixed to the front face of the plate 584 and causes the lowermost edge of the plate to extend over the forward edge of a frame member on the frame conveyor. Thus, as the upstanding portion of the frame member is closed by the bar 562, the upper edge of the frame member moves downwardly, engaging the plate 584 and causing the plate to pivot about its supports on the brackets 586 and, as the frame member is fully closed, the plate 584 swings backwardly and serves to prevent the frame member from opening after the bar 562 is retracted by the action of the cam 580. To insure proper positioning of the plate 584, in addition to the counterweight 588, a stop 590 is affixed to the plate 584 and adapted to engage the guide rail 592 to limit the degree of motion of the blade 584 over the frame. The closed frame and the enclosed cellophane package are then advanced to station 7 by the next successive operation of the conveyor.

Figure 35:
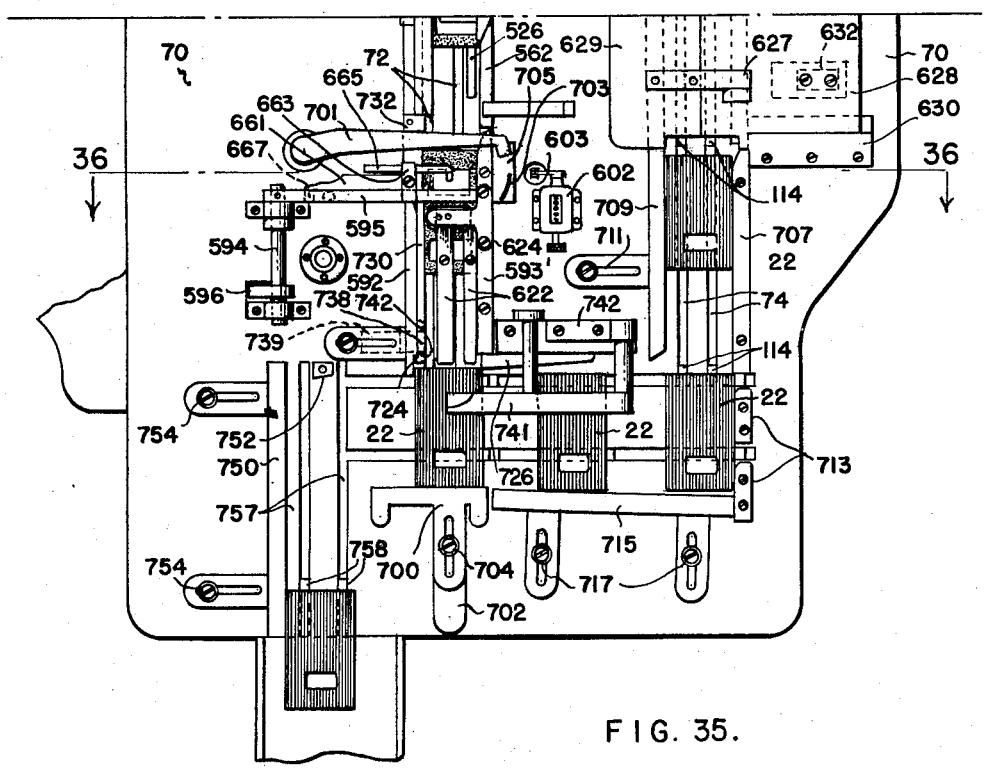
Figure 35 is an enlarged fragmentary plan view of the top of the machine showing the portion thereof adjoining the output end of the portion shown in Figure 18.

Frames passing into station 7 pass under a transversely extending arm 701 best shown in Figure 35 which is pivotally mounted at its forward end to the top plate 70 of the machine. The rear end of the arm 701 is adapted to engage a contact blade 703 which extends upwardly from an insulated plate 705 attached to the top plate 70. The height of the arm 701 above the frame conveyor is such that properly folded frames will pass beneath the arm without engaging the arm, whereas improperly folded frames having a portion thereof extending upwardly or any other upwardly extending article being advanced by the conveyor will engage the arm 701 causing it to rotate in a clockwise direction, as viewed in Figure 35, and engage the contact blade 703 serving to arrest the operation of the machine as will be hereinafter described.

In station 7 the frames are counted. This counting is accomplished by mechanism best shown in Figures 2, 35 and 36 which includes an arm 595 which extends toward the rear of the machine and over the frame conveyor from a rod 594 pivotally mounted on the top plate 70 to which it is affixed. A downwardly extending arm 596 is affixed to the rod 594 and has its lower end connected to a transversely extending rod 598 which extends toward the rear of the machine. A forwardly extending pin or pusher bar 600 is mounted on and below the rear end of the rod 598. A similar pusher pin 601 is mounted from and below the rod 598 toward the front of the machine from the pusher pin 600 and spaced therefrom. A guide channel 613 is affixed to the end frame 30 of the machine and extends toward the input end of the machine therefrom. A bar 614 is pivotally connected to the frame 30 and extends toward the input end of the machine therefrom within the channel 613. The channel 613 positions the bar 614 between the pusher bars 600 and 601.

A counter 602 is attached to the top plate 70 of the machine. This is a conventional type of counter which is operated by an arm 603 to which there is pivotally connected the upper end of a downwardly extending rod 604. The lower portion of the rod 604 extends in front of the bar 614 in a position adapted to be engaged thereby as will be hereinafter described.

A transversely extending bar 608 is pivotally connected at its forward end to the frame of the machine at 609. The bar 608 mounts a cam follower 610 which is adapted to be engaged by the cam 612 and driven downwardly thereby once each revolution of the cam against upward urging of spring 611 which is connected between the left-hand end or rear end of the bar 608 and a member affixed to the frame of the machine. An angle formed member 606 extends upwardly from the rear end of the bar 608 and toward the front of the machine. The horizontally extending portion of the angle is slotted and provides a guide for the rod 604 permitting motion of the rod 604 transversely of the machine but preventing motion of the rod 604 longitudinally of the machine. A block 607 is attached to the left-hand end of the bar 608 and extends toward the input end of the machine therefrom. This block is adapted to engage a collar 605 affixed to the lower end of the rod 604.

A pin 516 extends vertically through a guide bore in the plate 70 and engages the lower surface of the arm 595. The lower end portion of the pin engages a longitudinally extending bar 518 which, as will be hereinafter described, moves upwardly and downwardly with each cycle of operation of the conveyor.

The parts just described are so arranged that during the return stroke of the conveyor mechanism the pin 516 is lowered, permitting the arm 595 to drop downwardly upon the frame conveyor. It will be evident that the downward travel of the arm 595 will be limited if a frame is in station 7 on the frame conveyor. When the arm 595 is in the upward position as shown in Figure 36, the pin 601 will engage the bar 614 displacing the bar to the left as viewed in Figure 36 permitting the rod 604 to hang vertically with the collar 605 beneath the block 607. If the downward motion of the arm 595 is limited by a frame, the horizontal rod 598 will not be displaced sufficiently to the right to cause the pin 600 to engage the bar 614. On the other hand, if no frame is positioned under the end of the arm 595, the arm 595 will move downwardly upon the conveyor and the horizontal rod 598 will move to the right as viewed in Figure 36 a sufficient distance to cause the pin 600 to engage the bar 614 and move the depending rod 604 to the right a sufficient distance to carry the collar 605 to the right of the block 607 as viewed in Figure 36 and thus, upon motion of the block 607, a count will not be recorded.

The cam 612 is positioned so as to depress the bar 608 once each revolution of the cam shaft 60 and during the interval when the conveyor mechanism is returning toward the forward end of the machine.

A frame in station 7 is retained in a closed position by a bar 730 which extends toward the output end of the machine over the frame conveyor from a bracket 732 affixed to the guide bar 592 as shown in Figure 35. Frame members moving from station 7 to station 8 are inserted into sleeve members as will be hereinafter described.

In station 7 there is also provided means for detecting the presence or absence of the cellophane package in the frame. This means takes the form of a contact wire 665 which is supported by an insulating block 663 affixed to the rear end of a transversely extending bar 661 pivotally conected at 669 to the input side of the arm 595. The bar 661 has a forwardmost portion 667 which extends under the arm 595. The arrangement is such that the weight of the bar 661 and the wire 665 causes the bar and wire to rotate in a counterclockwise direction around the pivot 669, as viewed in Figure 36, to the limit permitted by the end 667.

When the arm 595 moves downwardly as previously described, the wire 665 is carried downwardly therewith in such a position as to engage the cellophane package between the holes in the frame. Upon engagement of a cellophane package, the wire 665 and the bar 661 will rotate in a clockwise direction around the pivot 669, as viewed in Figure 36, as the arm 595 continues its downward motion onto the frame. If no cellophane package exists within the frame, the contact wire 665 will make contact with the top plate 70 and arrest the operation of the machine as will be hereinafter described.

Figure 27:
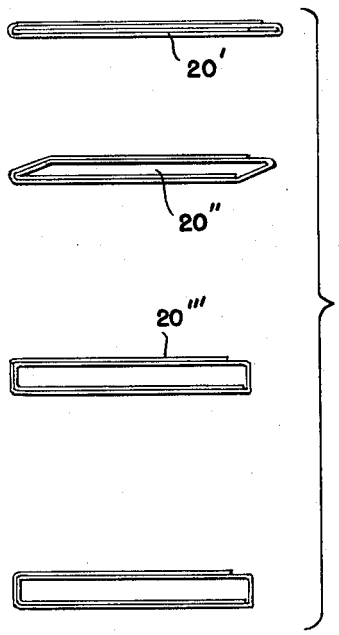
Figure 27 is a diagrammatic showing of the package parts appearing in various stations in Figure 26.
Figure 26:
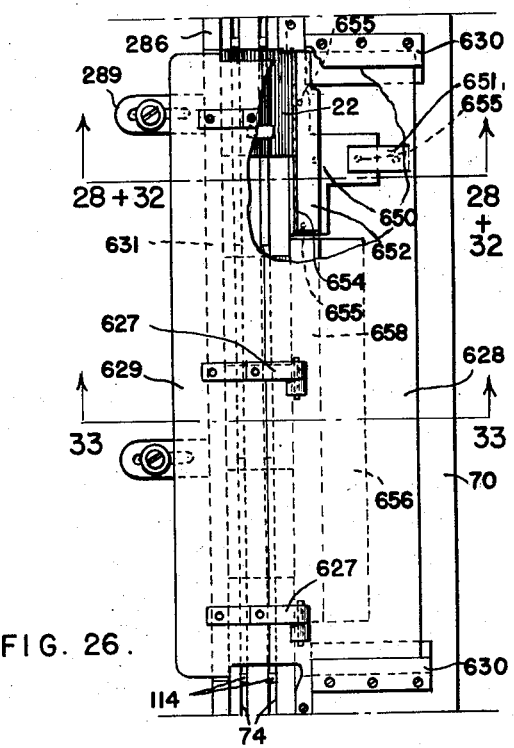
Figure 26 is a fragmentary top view of a portion of the machine shown in Figure 3.
Figure 28:
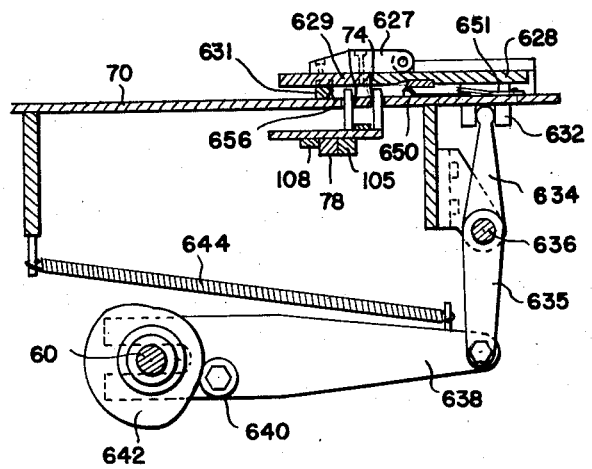
Figure 28 is a fragmentary transverse vertical section through the machine taken on the trace 28—28 shown in Figures 2, 3 and 26.

Referring now to the sleeve members, as previously described the sleeve members are fed from a magazine at the input end of the machine and pass down the sleeve conveyor to stations 4, 5 and 6 in which the sleeves which have been parallelogramed to a flat condition in packaging prior to their delivery to the assembly machine are now opened in order to permit the entry of the frame containing the cellophane package. This opening is primarily accomplished in stations 4, 5 and 6 as best shown in Figures 26, 27 and 28.

At the rear side of the machine adjacent to stations 4, 5 and 6, there is positioned a plate 628 which is mounted for transverse sliding motion between blocks 630 and is supported thereby in spaced relation above the top plate 70. The plate 628 is joined to an adjacent forwardly extending plate 629 by hinges 627. The forward portion of the plate 629 clears the guide bar 631 extending along the forward side of the sleeve conveyor and forming a continuation of the guide bar 286.

Extending downwardly from either longitudinal end region of the plate 628 are two blocks 632 each of which is slotted to receive the upper end of a vertically extending member 634. The lower ends of members 634 are connected to a rotatably mounted rod 636. A member 635 affixed to and extending downwardly from the rod 636 has its lower end pivotally connected to one end of a horizontally extending member 638. The other end of the horizontally extending member 638 mounts a cam follower 640 which is adapted to be urged by a spring 644 to engage a cam 642 mounted on the cam shaft 60. The cam 642 is so formed as to move the plate 628 transversely of the machine and to position the plate toward the rear of the machine during motion of sleeves by the sleeve conveyor and to move the plate toward the front and then toward the rear of the machine while sleeves on the sleeve conveyor are stationary. This oscillation of the plate 628 serves to open the sleeve members as will now be described.

As will be seen from Figure 34, as a sleeve leaves station 3 moving to the right, as viewed in Figure 34, an upper guide member 646 and a lower guide member 648 and the side guide bar 288 serve to raise the rearward side of the sleeve and position it above the turned up edge of a plate 650. The plate 650 is located on the top plate 70 by pivot pins 655 shown in Figures 26 and 32 extending upwardly through the plate. A screw 655' threaded into the top plate 70 is positioned adjacent to the rear end of a rearward extension of the plate 650 and serves to adjustably raise or lower the rear edge of the plate 650 which is held downwardly against the screw 655' by the forward edge of a spring leaf 651, the rear end of which is rigidly connected to the top plate 70. This arrangement including the pivot pins 655 provides for adjustment of the uppermost level of the upturned forward edge of the plate 650.

A plate 652 is affixed to the underside of the plate 628 and has a bevelled forward edge 654 adapted to pass over the upturned edge of the plate 650 when the plate 628 is moved toward the front of the machine. The guide bar 631 on the forward side of the sleeve conveyor under the plate 629 has itn rearward side undercut in the vicinity of station 4, as indicated at 656 in Figures 28 and 32. It will be noted that Figures 28 and 32 are both taken through station 4 and that the plate 650 and the bevelled plate 652 extend longitudinally under the plate 628 only within the limits of station 4.

Figure 33 shows a transverse vertical section through the machine typical for stations 5 and 6 in the sleeve conveyor. Before describing the apparatus in stations 5 and 6, it should be noted, as shown in Figure 32, that a sleeve 22 advanced into station 4 is in a completely flattened position as indicated at 20' in the uppermost of the group of figures in Figure 27. Upon oscillation of the plate 628 to the left, as viewed in Figure 32, the bevelled plate 652 engages the right-hand edge of the sleeve and the bevelled guide bar 631 engages the left-hand side of the sleeve. Pressure between these two sides will cause the sleeve to open as shown at 20'' in the second diagram of Figure 27.

In stations 5 and 6, as shown in Figure 33, a plate 656 is affixed to the top plate 70 and presents a longitudinally extending square edge 657 along the edge of the sleeve conveyor. A second longitudinally extending plate 658 is affixed to the moving plate 628 above the plate 656. The front edge of the moving plate 658 is slightly to the rear of the front edge of the stationary plate 657 when the parts are at rest, as shown in Figure 33, during motion of the sleeves by the sleeve conveyor. It will be evident that when the sleeve conveyor is at rest and the plates 628 and 658 move toward the front of the machine, the forward edge of the plate 658 will serve to form the sleeve into a more perfect rectangular form as shown at 20''' in Figure 27. The same operation is carried out in station 6 by parts identical to those shown in Figure 33 and merely serves to minimize any spring back which might otherwise take place in the sleeve and thus the sleeves leaving station 6 are in substantially rectangular form.

Sleeves discharged from station 6 pass through station 7 with no operation being performed therein and then to station 8 wherein they are engaged by the transverse conveyor indicated at 16 in Figure 1 and carried toward the front of the machine as will now be described.

As best shown in Figures 4 and 38, at the discharge end of the machine there is provided between the frame plates 62' and 64 a transversely extending pair of bars 660 which are positioned immediately below the top plate 70. The transversely extending bars 660 are affixed to the upper end of a pair of vertically extending members 662. The lower ends of the vertically extending members 662 are pivoted to the members 664 extending toward the input end of the machine and pivoted to frame members at 666 as shown in Figure 2. Extending between the vertically extending members 662 is a transverse plate 668 to which there is affixed a cam follower 670 shown in Figure 39 which is adapted to ride on a cam 672 mounted on the cam shaft 60. It will be evident that upon rotation of the cam 672, the vertically extending members 662 will oscillate upwardly and downwardly. Positioned between the transversely extending bars 660 is a bar 661 which carries three plates 671, 676 and 678 which extend across and rest upon the bars 660 and thus support the bar 661. Fingers 680 extend upwardly from the plates 671, 676 and 678 and define the stations in the transverse conveyor 16 shown in Figure 1.

As shown in Figure 38, the bar 661 is pivotally connected to the upper end of a link 682 which is an offset portion of one end of a transversely extending rod 684, the other end of which is pivoted to the upper end of a vertically extending bar 686. The bar 686 is pivoted at its lower end to the machine frame 688. Intermediate the ends of the bar 686 there is pivotally connected a transversely extending member 690 on which there is mounted a cam follower 692 urged by a spring 696 into engagement with the surface of a cam 694 on the main cam shaft 60.

From the foregoing it will be evident that rotation of the cam 694 will cause a transverse oscillation of the bar 661 and the conveyor fingers 680 and rotation of the cam 672 will cause a vertical oscillation of the conveyor fingers 680. The two cams are so synchronized that the fingers 680 are extending upwardly through transversely extending slots 698 in the top plate 70 when they are being moved toward the front of the machine and are depressed below the slots when they are being moved toward the rear of the machine and thus the sleeve members are advanced transversely of the machine in successive stations as shown in Figures 1 and 35 to the front thereof from the sleeve conveyor line to an intermediate station, then adjacent to the frame conveyor line and thereafter to the input end of a discharge conveyor indicated by the arrow 14 in Figure 1.

The sleeves in the sleeve conveyor at station 7 are located between longitudinally extending guide bars 707 and 709. The guide bar 709 is adjustably positioned by means of a slotted clamp arrangement indicated at 711. The sides of sleeves discharged into the transverse conveyor 16 from the sleeve conveyor 13, as shown in Figure 1, extending toward the rear of the machine are guided by guide blocks 713 as shown in Figure 35. The discharge ends of the sleeves in the transverse conveyor are guided by a guide bar 715 adjustably mounted on the top plate by means of slotted clamp arrangements 717. Sleeve members in the transverse conveyor 16 are positioned adjacent to the discharge end of the frame conveyor as shown in Figure 1. In this location, as best shown in Figures 35 and 37, there is provided a guide block 700 which is affixed by means of a bolt passing through a slot therein, as shown at 704, to a plate 702 which is positioned over a slot 706 in the top plate 70. Spaced blocks 708, as best shown in Figures 4 and 38, are affixed to the underside of the plate 702 and receive the rounded forward end of a bar 710 extending transversely of the machine below the top plate 70. The rearward end of the bar 710 is affixed to a vertically extending pivot pin 712 mounted in a bracket 714 affixed to the frame of the machine. The lower end of the pin 712 is affixed to the rear end of a transversely extending arm 716 which carries at its forward end a cam follower 718 which is urged by a spring 720 into engagement with a cam 722 affixed to the end of the cam shaft 60. It will be evident that upon rotation of the cam shaft 60 the member 700 will oscillate longitudinally of the machine.

As best shown in Figure 35, motion of the guide member 700 toward the input end of the machine will urge a sleeve member adjacent thereto into engagement with a recess 724 in the guide bar 592 at the end of the frame conveyor.

It is desirable to insure that sleeves in this position are in a true rectangular form before a frame assembly is delivered thereto. A forming operation is provided at this time by means of a block 726 which, as best shown in Figures 35 and 39, is positioned for motion transversely of the machine by a cover plate 728 which is mounted on a block 729 and is provided with a downwardly extending flange adapted to engage a shoulder 730 in the top surface of the block 726. Pivotally connected to the underside of the block 726 through a cut-away portion of the top plate 70 is a transversely extending rod 732, the rearward end of which is pivotally connected to the upper end of an arm 734. The lower end of the arm 734 is, as best shown in Figures 2 and 39, rigidly connected to a rotatably mounted shaft 736 which is supported from the frame of the machine. A transversely extending arm 738 has one end affixed to the shaft 736 and the other end extending toward the front of the machine and passing under a plate 739 extending longitudinally of the machine from the plate 668. From the foregoing it will be evident that as the plate 668 is oscillated upwardly and downwardly by the cam 672 and the cam follower 670 the guide block 726 will oscillate transversely of the machine.

The edge 740 of the guide block 726 facing toward the transversely extending conveyor and toward the discharge end of the machine is inclined, as viewed in Figure 35, so as to urge the sleeves toward the discharge end of the machine to a sufficient degree that they will enter the cut-away portion 724 of the end of the frame conveyor guide bar 592. The operation of the guide member 700 and the guide block 726 is so timed that when a sleeve member is positioned adjacent to the end of the frame conveyor by the transverse conveyor, as shown in Figure 35, the guide bar 700 will move the sleeve member toward the frame conveyor and into the cut-away portion 724 of the guide bar 592. Thereafter the block 726 will move toward the front of the machine and engage the portion of the rearward surface of the sleeve and force a corresponding portion of the forward surface of the sleeve into engagement with the guide bar 592, thus insuring that the sleeve is perfectly rectangular and in proper form to receive a frame assembly and also insuring that the sleeve is properly aligned transversely of the machine with respect to the frame conveyor.

Figure 40:
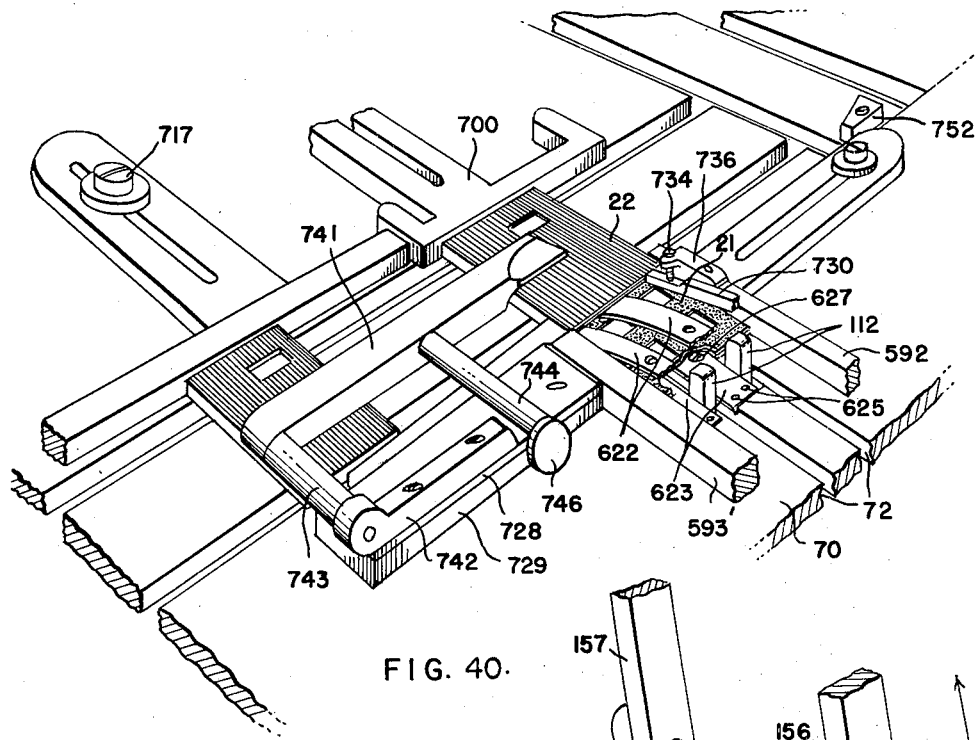
Figure 40 is a perspective view of a portion of the apparatus shown in Figure 35.

Leaf springs 622 shown in Figures 35 and 40 extend toward the output end of the machine over the frame conveyor from a bracket 624 affixed to the guide bar 593'. The springs 622 extend for a sufficient distance toward the discharge end of the machine so that they enter the sleeves when the sleeves are pushed toward the input end of the machine by the movable guide member 700. This relation of parts is shown in Figure 40. An additional pair of leaf springs 623 are affixed to the top plate 70 of the machine below the springs 622. The leaf springs 623 are affixed to the plate 70 in recesses therein by means of screws 625 and have their discharge ends adjustably elevated above the top plate 70 by means of adjusting screws 627 mounted in the top plate 70 below the leaf springs 623 and accessible through bores in the springs 622 and 623. The leaf springs 623 extend for substantially the same length as the leaf springs 622 and, as will be evident by viewing Figure 40, provide, a funnelling arrangement by means of which the advancing frame on the frame conveyor is guided into the positioned sleeve.

Additional guide means are provided in this station in the form of a bar 730 extending longitudinally of the machine adjacent to the guide rail 592 which is affixed to the guide rail 592 by means of a bracket 732 shown in Figure 35. The discharge end of the bar 730, cut-away in Figure 35 and shown in Figure 40, is vertically positioned by means of an adjusting screw 734 mounted in a bracket 736 affixed to the top of the guide rail 592. It will be evident that by adjusting the screw 734 the bar 730 may be depressed downwardly so as to accurately position the upper forward corner of the advancing frame as it enters the sleeve. This arrangement prevents the corner of the frame from engaging the face of the sleeve material and insures proper entry of frame into the sleeve.

A similarly acting guide member is provided in the form of a wedge plate 738 shown in Figure 35 which is mounted on the underside of the guide rail 592 in a slot 739 in the top plate 70. The thickness of the plate 738 is such that the edge of the plate over which the frame members first pass is recessed in the slot 739 below the level of the top plate 70 and the edge 742 which is positioned adjacent to the open sleeve member is slightly above the top of the plate 70 and raises the lower corner of the frame members sufficiently to insure proper entry of each frame into a sleeve. It will be evident from the foregoing that the space between the guide bar 730 and the guide plate 738 is adjustable to accommodate for frames of various thickness and that, upon movement of the guide bar 592 transversely of the machine to accommodate for frames of various widths, the bar 730 and the plate 738 mounted thereon are also moved transversely of the machine and thus are properly positioned with regard to any particular frame assembly employed.

The tapered guide bar 593' is slightly wider at its output end than at its input end and provides a minimum space between the guide bars 592 and 593' at their output or discharge ends, thus establishing a definite alignment of the frames at the descharge end of the frame conveyor with the sleeve positioned adjacent to the discharge end of the frame conveyor. The tapered guide bar 593' also serves to cock or displace the frame slightly from a longitudinally aligned position on the frame conveyor and to cause the rearward corner of the frame at the discharge end thereof to enter the positioned sleeve before the forward corner of the discharge end. This arrangement facilitates the alignment on entry problem for the obvious reason that once a first portion or corner of the leading edge of the frame has entered the sleeve, the remainder of the leading edge follows it into the sleeve.

As the inserting operation is concluded, the retraction of the movable guide member 700 is completed simultaneously with the completion of the movement of the frame conveyor fingers 112. The final movement of the fingers 112 thus serves to move the assembled sleeve and frame clear of the leaf springs 622 and 623 and clear of the end of the guide bar 592, thus positioning the assembled package for free movement transversely of the machine in the transverse conveyor.

A hold down and brake arrangement is provided to insure that the sleeves delivered to the inserting station by the transverse conveyor mechanism are positioned in flat ralation upon the top plate 70 and do not slide beyond the inserting station. This hold down arrangement includes a bar 741 extending transversely of the machine over the transverse conveyor. At the rear end of the bar 741 it is attached to a longitudinally extending member 743 which is pivotally connected at the input or right-hand end thereof, as viewed in Figure 40, to a support member 742 mounted on the plate 728 previously described. A bar 744 is affixed to the bar 741 intermediate its ends and extending toward the input end of the machine. A disc 746 is affixed to the bar 744 at its input end. The disc 746 is positioned adjacent to the input side of plate 728 and provides restraint against longitudinal motion of the bar 741 in the event that, in the absence of a sleeve in the inserting position, a frame delivered from the frame conveyor engages the side of the bar 741.

Assembled sleeve and frame packages are then moved by the transverse conveyor, indicated at 16 in Figure 1, to a position to be engaged by the discharge conveyor indicated at 14 in Figure 1. Assembled packages delievered to the discharge conveyor are positioned thereon by the fingers 680 of the transverse conveyor mechanism and by stop members 752 and 750 which are positioned at the longitudinal end and along the front sides, respectively, of the discharge conveyor. The conveyor bar 750 is adjustably mounted as indicated at 754 in order to accommodate assemblies of various widths.

Figure 21:
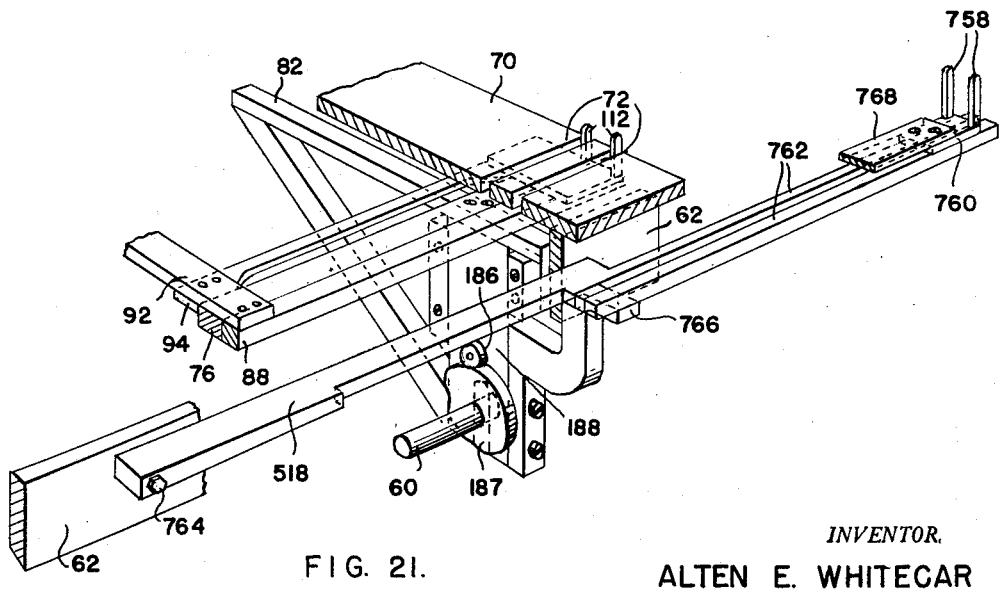
Figure 21 is a perspective view of a portion of the machine shown in Figures 35, 37 and 38.

As is best shown in Figure 21, the conveyor fingers 758 are attached to a plate 760 which is slidably positioned on a pair of rails 762. The plate 760 has affixed to its underside, not shown in the drawing, a block which is adapted to ride between the rails 762 and position the plate thereon. The left-hand ends of the rails 762, as viewed in Figure 21, are rigidly connected to a bar 518, previously referred to, which is pivoted at its left-hand end to the frame plate 62 of the machine. The bar 518 and the guide rails 762 are supported at their point of juncture by a foot member 766 upon which they rest which is in turn affixed to a plate 188 which moves upwardly and downwardly with the operation of the conveyor mechanism previously described in connection with Figure 36. It will be evident that this upward and downward motion will be imparted to the fingers 758 which will travel in a slight arcuate path around the pivot 764. The plate 760 is moved longitudinally of the guide bars 762 by means of its connection to one end of the plate 768, the other end of which as shown in Figures 4 and 6 is pivoted to the upper end of a vertically extending arm 770, the lower end of which is affixed to the shaft 146 which serves to actuate the frame and sleeve conveyor mechanisms as previously described in connection with Figures 5 and 41. It will be apparent that the action of the shaft 146 will be to cause longitudinal oscillation of the fingers 758. These two motions imparted to the fingers 758 cause the fingers to move toward the discharge end of the machine while positioned above the top plate 70 of the machine and extending through the slots 757 therein and to be moved toward the input end of the machine while depressed below the surface of the top plate 70. By this motion the fingers 758 carry the assembled packages along the discharge conveyor as indicated at 14 in Figure 1 and serves to discharge the assembled packages from the machine.

Heretofore throughout the description various safety contacting devices have been referred to for the purpose of interrupting the operation of the machine. These contacting devices were the conveyor drive safety contact 182 shown in Figure 41, the cellophane check contact 431 shown in Figures 3, 18 and 22, the frame check and frame punch check contacts 308 and 310, respectively shown in Figure 15, and the cellophane recheck and frame closure check contacts 665 and 703, respectively, shown in Figures 3, 35 and 36. In addition to these contacts there is provided a sleeve check contact 772 shown in Figures 3, 14 and 15.

The sleeve check contact 772 is in the form of an arm rigidly connected with an arm 774 and pivotally mounted on a bracket 776 affixed to the top plate of the machine. The mounting serves to insulate the arm 774 from the top of the machine. A vertically extending pin 778 made of an insulating material passes through the top plate 70 with its upper end positioned below the arm 774 and its lower end in engagement with a plate 780 affixed to a longitudinally extending arm 782 shown in Figure 4, the right-hand end of which is pivoted at 784 to the frame of the machine and the left-hand end of which at 786 rests upon the cross member 80. The length of the pin 778 and the arrangement of the arms is such that when the member 80 is in a depressed position the free end of the arm 772 will engage the top plate of the conveyor unless a sleeve is in position therebetween on the conveyor. When the cross member 80 is in an elevated position, at which time the conveyor is advancing the sleeve members, the arm 772 is held upwardly clear of the conveyor so as not to interfere with advance of the sleeve members. This arrangement for raising and lowering the arm 772 provides for lowering the arm 772 only when a sleeve member should be in position on the conveyor below the arm. Thus the check mechanism is prevented from indicating the absence of sleeve members between successive sleeve members on the conveyor. The sleeve check arm 772 which is insulated from the frame of the machine except when the arm is lowered and if at that time there is no sleeve interposed between it and the top plate of the machine, serves, in the absence of a sleeve member, to arrest the operation of the machine which will be hereinafter described.

Figure 43:
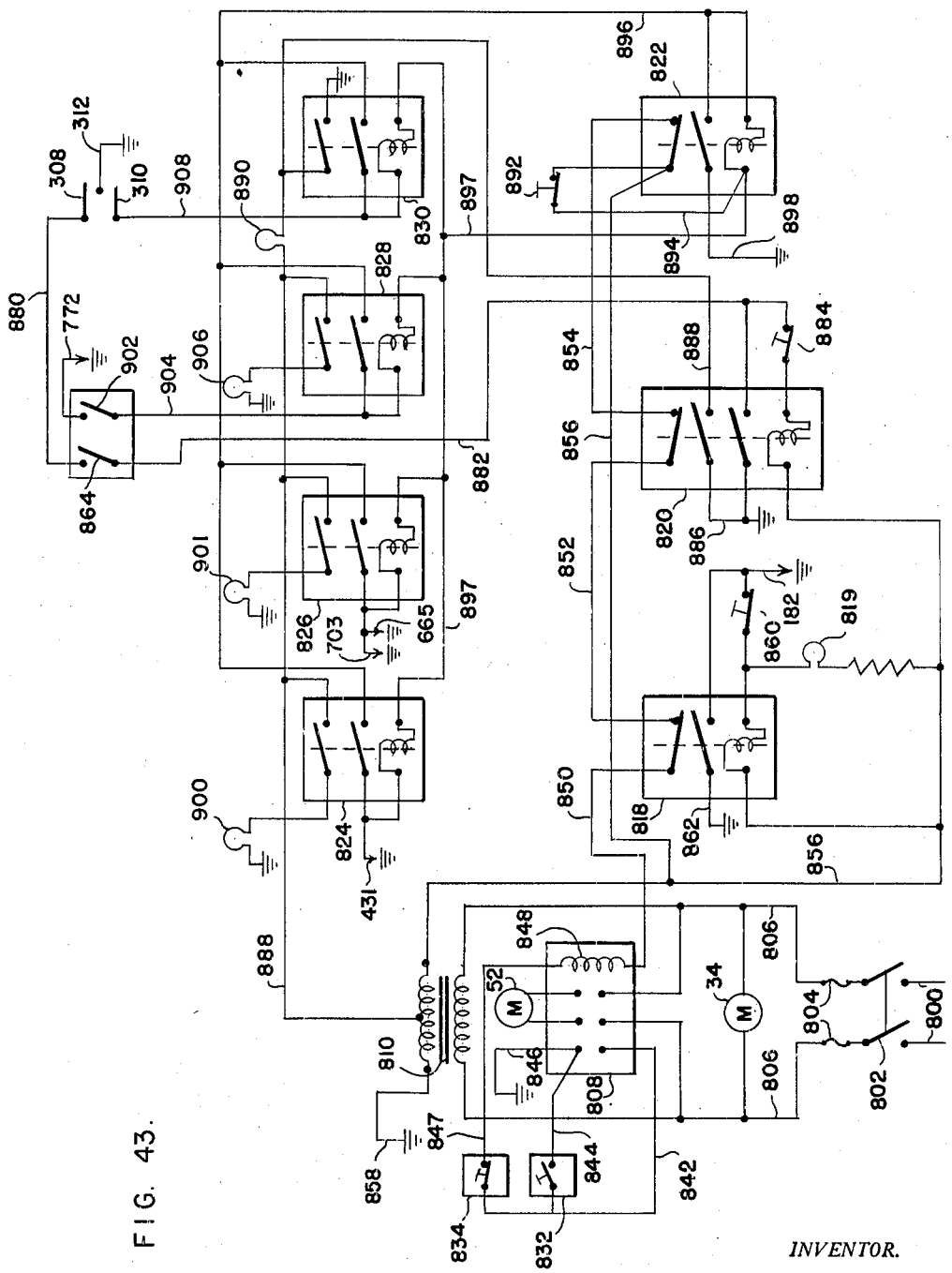
Figure 43 is a wiring diagram of the electrical circuit involved.

The electrical system involved in the machine is shown diagrammatically in Figure 43. A suitable source of electrical power is connected through conductors 800, a disconnect switch 802 and fuses 804 to the pair of conductors 806. The motor 34 which drives the vacuum pump 36 is connected across the conductors 806. Two of the input contacts of a three pole motor starter 808 are connected to the conductors 806. The corresponding output terminals are connected to the motor 52 serving to drive the mechanisms of the machine. The primary side of a step down transformer 810 is also connected across the conductors 806.

The motor starter 808, as shown in Figure 2, not only serves to control the flow of electric current to the motor 52 in the conventional manner but also serves to control a vacuum operated motor brake control 812 which is connected to the vacuum tank 42 by means of lines 48, 814 and a control valve 816 operated by the motor starter 808. This arrangement is entirely conventional and need not be described in detail herein.

Also included in the control system is a group of relays. These relays, as shown in Figure 43, include a conveyor drive safety relay 818, a frame punch check relay 820, a master relay 822, a cellophane check relay 824, a cellophane recheck and frame closure check relay 826, a sleeve check relay 828 and a frame check relay 830. The circuit also includes a start switch 832 and a stop switch 834. The start switch 832 is mounted under the top plate 70 of the machine, as shown in Figure 3, and includes control lever 833 extending upwardly through the top plate for access by an operator. The start switch is normally open and is closed when held in a depressed condition by the operator. A stop switch 834 as shown in Figure 15 is mounted under the top plate 70 and is actuated by a rail 836 extending longitudinally of the machine along the front side thereof in order to be readily accessible to an operator. The rail 836 is connected through a pivot arrangement 838 to an arm 840 which is positioned to actuate the switch 834 which is normally closed and is opened by depression of the rail 836 by an operator.

One side of each of the start and stop switches is connected together and connected to a third terminal of the motor starter 808 through conductor 842. The other side of the start switch is connected through conductor 844 to the corresponding output terminal of the starter which is connected to ground through conductor 846. The other side of the stop switch is connected through conductor 847 to the coil 848 of the motor starter. The other side of the motor starter coil 848 is connected through conductor 850 through a normally closed contact of the relay 818, conductor 852, a normally closed contact of the relay 820, conductor 854, a normally closed contact of the relay 822, conductor 856 to one side of the secondary of the transformer 810. The other side of the secondary of the transformer 810 is connected to ground at 858.

From the foregoing it will be evident that if all of the relays 818, 820 and 822 are deenergized and the start button is closed and, of course, the disconnect switch 802 is closed, power will be supplied from the secondary of the transformer 810 through the starter coil 848 serving to close in the motor starter. Closure of the motor starter serves to seal in the motor starter through conductor 842 and the stop switch 834. Thus the motor 52 remains energized even though the start switch is permitted to open. The motor will remain energized until either the stop switch is manually opened or one of the relays 818, 820 or 822 is energized opening its normally closed contact.

The conveyor drive relay 818 may be energized as a result of the grounding of contact 182 shown in Figure 41 in connection with the conveyor mechanism. Grounding of this contact, as will be seen from Figure 43, completes a circuit from ground through contact 182 through a reset button 860 through the coil of the carriage relay 818 to conductor 856. Energization of the relay 818 serves to open its normally closed contact interrupting operation of the machine as previously described and serves to close its normally open contact, thus connecting the carriage relay coil to ground at 862. A lamp 819 connected across the coil of the relay 818 is illuminated when the relay is energized and serves to indicate to an operator when operation of the machine has been arrested by operation of the conveyor drive relay 818. A reset push button 860 is provided in order that the carriage relay 818 may be manually dropped out permitting its normally closed contact to reclose permitting the drive motor to be restarted.

The frame punch check relay is energized as the result of grounding of the frame punch contact 308 shown in Figure 15 provided that this grounding occurs during the time interval in which a switch contact 864 is closed. The mechanism involved in the switch providing the contacts 864 is shown in Figures 4 and 7 and includes a shaft 866 which is rotatably mounted on the frame of the machine and supports an upstanding arm 868 on which there is mounted a cam follower 870 held into engagement by a spring 872 with the face of a cam 874 mounted on the cam shaft 200. Two pairs of connected contacts 864 and 902 are mounted on an insulating framework 876 affixed to the shaft 866. Two pairs of contact fingers 873 are attached to an insulating block 875 affixed to the framework of the machine. As will be evident by viewing the drawings, upon actuation of the cam follower 870 by the cam 874, each pair of fingers will engage a pair of contacts for a time interval depending upon the contour of the cam 874. This contour is so arranged as to close the contacts 864 during the time interval when the punching operation is occurring. It will be noted from Figure 15 that when the punch assembly is in an elevated position during which time the frames are being moved along the conveyor that the contact 308 is grounded. It will be evident that during this time interval the switch 864 must be open to prevent undesired operation of the control system to arrest operation of the machine. Upon the failure of a punch operation and the failure of the contact 308 to open, when the contact 864 closes, a circuit is established from ground through contacts 308 and 864 which are connected by a conductor 880 and through a conductor 882 and a reset button 884 through the coil of the frame punch check relay 820 to conductor 856 and the secondary of the transformer 810 to ground. Upon energization of the coil of the frame punch check relay 820, the normally closed relay contact will open interrupting the operation of the machine and the normally open contacts will close. This closure connects the coil of the punch check relay to ground at 886 and thus provides a seal in for the relay holding the relay energized until the contact 308 or the contact 864 is open and the reset button 884 is opened. Closure of the other normally open contact of the frame punch check relay connects ground at 886 through conductor 888 to a lamp 890, the other side of which is connected to a tap in the secondary of the transformer 810. Thus operation of the frame punch check relay 820 will light the indicator lamp 890 serving to apprise the operator of the cause of the difficulty.

The master relay has one side of its coil connected to a conductor 894 and through a master reset button 892 to the conductor 856 connected to one side of the secondary of the transformer 810. The other side of the coil of the master relay is connected through conductor 896 to one side of a normally opened contact in each of the relays 824, 826, 828 and 830. Upon operation of any of these check relays, the master relay is energized and serves to open the motor starter 808 as previously described. Operation of the master relay serves to close the normally open contact in the master relay one side of which is connected to the conductor 896 and the other side of which is grounded at 898. Thus the relay is sealed in until the master reset button 892 is opened and the relays 824, 826, 828 or 830 which give rise to operation of the master relay is deenergized.

Considering now the relays 824, 826, 828 and 830, the first of these is the cellophane check relay 824 which has one side of its coil connected to the conductor 897 extending between the master relay coil and reset button. Thus the cellophane check relay 824 has one side of its coil connected to one side of the transformer secondary and the other side of its coil is arranged to be connected to ground through the cellophane check contact 431 in the event that a cellophane package is not being fed to the frame conveyor at the proper time interval. Operation of the cellophane check relay 824 serves to close its two normally open contacts, one of which is connected to ground through the contact 431 and has its other side connected to conductor 896. The other normally open contact of the cellophane check relay serves to supply power from conductor 888 to a signal lamp 900 which serves to indicate to an operator the source of the interruption. When the contact 431 is opened and the master relay reset button 892 is opened permitting the master relay to drop out and permitting the cellophane check relay to open, the machine may be restarted.

A cellophane recheck relay 826 is operated by the cellophane recheck contact 665 and/or the frame closure check contact 703 which is engaged by the movable arm 701 and grounded thereby. Upon the closure of either of these contacts to ground, the cellophane recheck relay 826 is energized through conductor 897 which causes the relay to close its two normally open contacts energizing the master relay 822 and energizing a signal lamp 901 by connecting the lamp to the conductor 888. The signal lamp 901 serves to indicate to the operator the reason for the interruption.

The sleeve check relay 828 is operated by the sleeve check contact 772 which is connected through contact 902 in the timing switch mechanism previously described. The ungrounded side of the timing switch contact 902 is connected through conductor 904 to one side of the coil of the sleeve check relay. The other side of the coil of the sleeve check relay is connected to conductor 897 and thence through the master reset button 892 to power. Upon energization of the sleeve check relay, its two contacts are closed serving to lock in the sleeve check relay and energize the master relay 822 and also serving to energize the signal lamp 906 serving to indicate to the operator the reason for interruption of operation of the machine.

The frame check relay 830 has one side of its relay coil connected to the frame check contact 310 through conductor 908. Grounding of the contact 310 serves to energize the relay 830 through conductor 897 and the master reset button 892. Operation of this relay closes its two normally open contacts one of which serves to energize the master relay and the other of which serves to complete the circuit through the lamp 890 to ground illuminating the lamp and thus indicating to an operator the reason for the interruption.

From the foregoing description and the wiring diagram in connection with Figure 43, it will be evident that the occurrence of any obstruction to the motion of the conveyor or upon the failure of the mechanism for feeding the cellophane packages, the frames and the sleeves to the various conveyors or upon the failure of the mechanism for punching out the removable portions of the frames or upon the failure of the frame to close or to close properly around the cellophane package, further operation of the machine will be arrested until the failure is remedied by the operator.

It will be evident from the foregoing that the apparatus provides for assembly of packages from enclosures and article containing inserts. While in the embodiment disclosed the form of the final package is that of a square prism, it will be apparent that packages of various shapes may be assembled by means of apparatus such as this provided that the package and the parts thereof have a sufficient number of plane or generally rectangular sides to make possible the handling and guiding of the package parts as required.

The arrangement of the conveyors and the sequence in which the various assembling operations are performed provides a highly desirable arrangement in which all of the parts of the package to be assembled are supplied to the apparatus at one end thereof and the assembled packages are discharged from the other end thereof. Additionally, the arrangement provides for all of the feeding and assembling operations to be carried out above the surface of a generally rectangular plane. This arrangement not only provides good visibility and accessibility to both the package parts and the machine parts involved in each of the various operations, but also provides a convenient layout by means of which the visibility and accessibility are available in conjunction with the desirable arrangement of input and output of parts previously mentioned.

What is claimed is:
1. Apparatus for assembling packages comprising means for inserting an article containing insert into an enclosure, means for conveying a succession of enclosures to said inserting means, each of said inserts having portions removed therefrom to accommodate the article contained therein, means for conveying a succession of inserts to said inserting means, means for positioning an article in each of the inserts conveyed by said insert conveying means, means for conveying a succession of articles to said positioning means, and means for removing said portions from inserts conveyed by said insert conveying means prior to their delivery to said article positioning means.

2. Apparatus for assembling packages comprising means comprising an elongated horizontally extending surface, means positioned on said surface for inserting an article containing insert into an enclosure to form a package, means for conveying a succession of enclosures longitudinally over said surface and to said inserting means, means for conveying a succession of inserts longitudinally over said surface and to said inserting means, means for positioning an article in each of the inserts conveyed by said insert conveying means, and means for conveying a succession of articles to said article positioning means, said article conveying means including means for conveying a succession of articles transversely of said surface to said positioning means, means for conveying a succession of articles longitudinally of and above said surface, and means including separable horizontal surface presenting members for receiving articles from said longitudinal article conveyor and depositing them upon said transverse article conveyor.

3. Apparatus for assembling package parts comprising means for inserting an insert part into an enclosure part to form a package, means for conveying a succession of enclosure parts to said inserting means, means for successively delivering enclosures from the bottom of a stack thereof to said enclosure part conveying means, means for conveying a succession of insert parts to said inserting means, and means for successively delivering insert parts from the bottom of a stack thereof to said insert part conveying means, at least one of said delivering means including a rotary member having a helical surface positioned to provide for adjustment of a space through which successive parts are delivered from the bottom of its associated stack.

4. Apparatus for assembling package parts comprising means for inserting an insert part into an enclosure part to form a package, means for conveying a succession of enclosure parts to said inserting means, means for successively delivering enclosure parts from the bottom of a stack thereof to said insert part conveying means, means for conveying a succession of insert parts to said inserting means, and means for successively delivering insert parts from the bottom of a stack thereof to said insert conveying means, at least one of said delivering means including oscillating means below its associated stack including a shoulder for engaging the lowermost part in the stack and carrying it out from beneath the stack, the upper surface of said oscillation member having a replaceable member mounted thereon providing said engaging shoulder and providing a surface having a lower coefficient of friction than the surface supporting the delivered part.

5. Apparatus for assembling packages comprising means for inserting an article carrying insert into an enclosure, means for conveying a succession of inserts from a supply thereof to said inserting means, operation performing means along said insert conveyor for positioning articles in said inserts, means for conveying a succession of enclosures from a supply thereof to said inserting means, operation performing means along said enclosure conveyor for shaping enclosures for the receipt of inserts, said insert and enclosure conveying means extending in side by side relation for a major portion of their lengths and with said two operation performing means being positioned along adjacent portions of the two conveying means.

6. Apparatus for assembling packages comprising means comprising an elongated horizontally extending surface, means positioned on said surface for inserting an article containing insert into an enclosure to form a package, means for conveying a succession of enclosures longitudinally over said surface and to said inserting means, means for conveying a succession of inserts longitudinally over said surface adjacent to said enclosure conveying means and to said inserting means, means for positioning an article in each of the inserts conveyed by said insert conveying means, and means for conveying a succession of articles to said article positioning means, said article conveying means including means for conveying a succession of articles longitudinally of said surface adjacent to said insert conveying means, means including oscillating means for conveying a succession of articles transversely of said surface to said positioning means and a vacuum cup for transferring articles from said longitudinally extending article conveyor to said transversely extending oscillating article conveyor.

7. Apparatus for assembling packages comprising means for inserting an insert into an enclosure to form a package, means for conveying a succession of enclosures to said inserting means, and means for conveying a succession of inserts to said inserting means, said inserting means including opposing flexible members positioned to receive therebetween inserts fed by said insert conveying means and positioned to receive therearound enclosures fed by said enclosure conveying means prior to insertion of inserts into the enclosures.

8. Apparatus for assembling packages comprising means for inserting an insert into an enclosure to form a package, means for conveying a succession of rectangular in cross-section sleeve enclosures to said inserting means, means for conveying a succession of inserts to said inserting means, said inserting means including opposing flexible members positioned to receive therebetween inserts fed by said insert conveying means and positioned to receive therearound encloures fed by said enclosure conveying means prior to insertion of inserts into the enclosures and means to square up the end of the enclosures prior to the insertion of inserts, the last mentioned means including a member engaging one side of said end and a block adapted to advance against the other side of said end.

9. Apparatus for assembling packages comprising means to open up flattened sleeve enclosures including a member engaging one side of the enclosures and a plate adapted to advance against the opposite side of the enclosures, means for conveying a succession of flattened sleeve enclosures to said first mentioned means, means for inserting inserts into said enclosures to form packages, means for conveying the opened enclosures to said inserting means, means for conveying a succession of inserts to said inserting means, said inserting means including opposing flexible members positioned to receive therebetween inserts fed by said insert conveying means and positioned to receive therearound enclosures fed by said enclosure conveying means prior to insertion of inserts into the enclosures.

10. Apparatus for assembling packages comprising means comprising an elongated horizontally extending surface, means positioned on said surface for inserting an article containing insert into an enclosure to form a package, means for conveying a succession of enclosures longitudinally over said surface and to said inserting means, means for conveying a succession of inserts longitudinally over said surface adjacent to said enclosure conveying means and to said inserting means, means for positioning an article in each of the inserts conveyed by said insert conveying means, and means for conveying a succession of articles to said article positioning means, said article conveying means including means for conveying a succession of articles longitudinally of and above the surface adjacent to said insert conveying means, fixed transverse blades adapted to receive articles from said article conveying means at an elevation above the surface adjacent the insert conveying means, movable blades each having a raised portion to advance said articles transversely, a platform at an elevation below said movable blades and above the surface adjacent the insert conveying means to receive articles advanced transversely from the fixed blades, said movable blades each having a lower portion adapted to advance said articles beyond said platform to a position over the insert conveying means.

11. Apparatus for assembling packages comprising means comprising an elongated horizontally extending surface, means positioned on said surface for inserting an article containing insert into an enclosure to form a package, means for conveying a succession of enclosures longitudinally over said surface and to said inserting means, means for conveying a succession of inserts longitudinally over said surface adjacent to said enclosure conveying means and to said inserting means, means for positioning an article in each of the inserts conveyed by said insert conveying means, and means for conveying a succession of articles to said article positioning means, said article conveying means including means for conveying a succession of articles longitudinally of and above the surface adjacent to said insert conveying means, fixed transverse blades adapted to receive articles from said article conveying means at an elevation above the surface adjacent the insert conveying means, movable blades each having a raised portion to advance said articles transversely, a platform at an elevation below said movable blades and above the surface adjacent the insert conveying means to receive articles advanced transversely from the fixed blades, said movable blades each having a lower portion adapted to advance said articles beyond said platform to a position over the insert conveying means and spaced supports to support said articles over the insert conveying means and means to separate said spaced supports to drop the articles onto said insert conveying means.

References Cited in the file of this patent

UNITED STATES PATENTS

| | | |
|---|---|---|
| 639,354 | Butler | Dec. 19, 1899 |
| 1,122,641 | Smith | Dec. 29, 1914 |
| 1,185,822 | Price | June 2, 1916 |
| 1,269,308 | Reifsnyder | June 11, 1918 |
| 1,552,814 | Anderson | Sept. 8, 1925 |
| 1,924,964 | Smith | Aug. 29, 1933 |